US005742247A

United States Patent [19]

Chujo

[11] Patent Number: 5,742,247

[45] Date of Patent: Apr. 21, 1998

[54] ONE BIT TYPE CONTROL WAVEFORM GENERATION CIRCUIT

[75] Inventor: Takeshi Chujo, Tokyo, Japan

[73] Assignee: Mitsubishi Denki Kabushiki Kaisha, Tokyo, Japan

[21] Appl. No.: 726,603

[22] Filed: Oct. 7, 1996

[30] Foreign Application Priority Data

Jun. 11, 1996 [JP] Japan .................................... 8-149566

[51] Int. Cl.$^{6}$ ........................................................ H04N 3/00

[52] U.S. Cl. ............................................. 341/144; 345/134

[58] Field of Search .............................. 341/144; 345/134

[56] References Cited

U.S. PATENT DOCUMENTS 4,707,691 11/1987 Hammura et al. ........................ 340/754

*Primary Examiner*—Marc S. Hoff
*Assistant Examiner*—Peguy Jean Pierre
*Attorney, Agent, or Firm*—Burns, Doane, Swecker & Mathis, LLP

[57] ABSTRACT

A one bit type control waveform generation circuit reads out a byte data item of a byte data length from a memory addressed by a counted value obtained by a reference clock generated by a clock signal in synchronism with a synchronizing signal, and generates an optimum control waveforms to be used for CRT drivers by converting the readout data items per bit to analogue signals.

16 Claims, 19 Drawing Sheets

ONE PERIOD
SYNCHRONIZING SIGNAL
ADDRESS COUNT
ADDRESS
0000
0001
0002
0003
1 BYTE DATA
00
01
02
03
OUTPUT OF D/A CONVERTER
LIMIT DATA LATCH

6 MEMORY
0000
0001
0002
0003
00
01
02
03

ONE BIT TYPE CONTROL WAVEFORM GENERATION CIRCUIT

BACKGROUND OF THE INVENTION

1. Field of the Invention

The present invention relates to a one bit type control waveform generation circuit for generating various types of horizontal and vertical control waveforms to control drivers for CRT (cathode ray tube) display monitors.

2. Description of the Prior Art

In prior art, there is a conventional control waveform generation circuit as a circuit to read out data items which are stored per one byte in memories and to drive an operation amplifier to generate various types of control waveforms used for controlling operations of CRT display monitors, such as horizontal waveforms and vertical waveforms, and to provide them to external drive circuits. There is a disclosed technique in the Japanese Patent Publication of the application No.6-186947, for example.

FIG. 18 is a block diagram showing the configuration of a conventional control waveform generation circuit. In FIG. 1, reference number 18 designates a reference clock generator for receiving a synchronizing signal and a clock signal and generating a reference clock signal, 2 denotes a limit data latch for receiving and temporarily storing a count limit value that has been set for use in an address counter 4 that will be described later in detail.

Reference number 3 indicates a NAND circuit for receiving output signals from the reference clock generator 1 and a comparator 5 that will be explained later in detail and then operates by using the received output signals. Reference number 4 designates the address counter for receiving the output from the NAND circuit and counts it as an address count clock. This value counted by the address counter 4 is reset by receiving a synchronizing signal. Reference number 5 denotes the comparator for comparing the counted value transmitted from the address counter 4 with the set value stored in the limit data latch 2 and for generating a control signal whose level is changed from a high level to a low level when the comparison result indicates that they are equal to each other. Reference number 6 designates a memory for receiving a counted value as an address data item from the address counter 4 and then reads out a one byte data item, which has been stored in this memory 6, addressed by the received counted value, 8 denotes a one byte latch circuit for temporarily storing a one byte data item transferred from the memory 6 by receiving the clock signal as the latch timing signal from the reference clock generator 1. Reference number 34 designates a digital to analogue (D/A) converter for receiving data item transferred from the one byte latch circuit 8 and for converting this date item of a digital form to an analogue signal of an analogue form.

The operation of the conventional control waveform generation circuit described above will be explained.

FIG. 19A is a timing chart showing the operation of the conventional control waveform generation circuit shown in FIG. 18.

The reference clock generator 1 generates a reference clock signal in synchronism with a synchronizing signal provided from outside and divides the reference clock signal to obtain a reference clock signal having a desired frequency value. The address counter 4 receives the reference clock signal as an address count clock and counts up the counter (not shown) by one and transmits the counted value.

Next, the memory 6 shown in FIG. 19B receives an output as an address from the address counter 4 and reads out an one byte data item stored in a memory field in the memory 6 addressed by the received address. The one byte latch circuit 8 receives the one byte data item from the memory 6 and temporarily stores it. The D/A converter 34 converts the one byte data item of the digital form to a control wave form as an analogue signal and then transmits the control waveform to drive circuits (not shown).

The limit data latch circuit 2 has store the count limit value for the address counter 4. The limit data latch circuit 2 temporarily stores the count limit value and transfers the count limit data to the comparator 5 simultaneously.

The comparator 5 compares the count limit data from the limit data latch circuit 2 with the counted value from the address counter 4. When they agree, the comparator 5 generates a signal whose value is changed from the high level to the low level and transfers the generated signal to the NAND circuit 3.

Next, when the signal from the comparator 5 is the low level signal, in other words, when the data from the limit data latch circuit 2 and the counted value from the address counter 4 agree, one input terminal of the NAND circuit 3 receives the low level input. Accordingly, even if the NAND circuit 3 receives the reference clock signal having the desired frequency value transmitted from the reference clock generation circuit 1, the NAND circuit 3 outputs only the high level signal. In other words, the transmission of the reference clock signal having the desired frequency value from the reference clock generation circuit 1 to the address counter 4 is halted (the halt state of reference clock signal transmission). The transmission of the reference clock signal as the address count clock for counting up the address counter 4 by one is halted. In this case, the counter value indicating the memory field in the memory 6, namely the address to be transmitted to the memory 6, is not changed. Therefore new one byte data item is not read out from the memory 6.

Based on the procedures described above, desired control waveforms are generated according to the change of the frequency of the synchronizing signal and transmits them to drive circuits (not shown) for controlling of the operation of a CRT.

Since the conventional control waveform generation circuit has the configuration described above, it is required to incorporate a memory and a D/A converter into the conventional control waveform generation circuit for each of required control waveforms. Therefore the circuit size and the power consumption of the conventional control waveform generation circuit are increased according to, the increased number of control waveforms to be required.

SUMMARY OF THE INVENTION

Accordingly, an object of the present invention is, with due consideration to the drawbacks of the conventional control waveform generation circuit, to provide a one bit type control waveform generation circuit using a bit type processing method in which the minimum processing unit of a signal is a bit and the one bit type control waveform generation circuit has a small circuit size and can minimize the increased of the sizes of a memory and a D/A converter, to be as small as possible, even if the number of control waveforms to be transmitted to drive circuits is increased.

In accordance with one preferred embodiment of the present invention, a one bit type control waveform generation circuit comprises reference clock generation means for generating a reference clock signal having a desired frequency value in synchronism with the synchronizing signal, decoder means for generating an address count clock in synchronism with the reference clock and the value of the address count clock from the decoder means being reset by receiving of the synchronizing signal, address counter means for counting the number of the address count clocks transferred from the decoder means, comparator means for comparing the counted value from the address counter means with a desired count value and for halting the transmission of the reference clock to the decoder means when both count values are equal to each other, and read-out conversion means for reading out a data item having a predetermined data length from memory means addressed by the counted value transferred from the address counter means and for reading out a bit data item per bit from the readout data having the predetermined data length, for converting the bit data item of a digital form to an analogue signal to form an optional control waveform, and for providing the optional control waveform to outside. Thus, the one bit type control waveform generation circuit has a configuration of a small circuit size and can efficiently provide various types of control waveforms to be used for many kinds of drive circuits.

In accordance with another preferred embodiment of the present invention, the reference clock generation means receives a clock signal and a horizontal synchronizing signal as the synchronizing signal, and generates a reference clock having a predetermined frequency value which is synchronized with the synchronizing signal. The one bit type control waveform generation circuit of this embodiment further comprises a limit data latch means for storing a horizontal period count limit value as a count limit value used for the horizontal synchronizing signal. The decoder means generates an address count clock which is in synchronism with the reference clock. The value of the address count clock is reset based on the horizontal synchronizing clock signal. The address counter means counts the number of the address count clock from the decoder means. The counted value from the address counter means is reset based on the horizontal synchronizing signal. The comparator means compares the counted value from the address counter means with the horizontal synchronous count limit value and halts the transmission of the reference clock to the decoder means when both the counted value and the horizontal synchronous count limit value are equal to each other. The memory means reads the counted value as an address data item from the address counter means and reads out one byte data item which has already been stored in a memory field addressed by the counted value. The readout conversion means comprises one byte latch means for receiving the byte data item transferred from the memory means based on the address count clock as a data latch timing transmitted from decoder means and for storing the received byte data item, shift register means for converting the byte data item stored in the one byte latch means based on the reference clock to a bit data item, one bit latch means for storing the bit data item transmitted from the shift register means based on the reference clock, and analogue conversion means for converting the bit data item in a digital stored in the one bit latch means form to an analogue signal, for generating an optimum control waveform and for transmitting the generated control waveform to outside. Thus, the one bit type control waveform generation circuit of the present invention has a configuration of a small circuit size and can efficiently provide various types of horizontal control waveforms to be used for many kinds of drive circuits.

In accordance with another preferred embodiment of the present invention, the reference clock generation means receives a vertical synchronizing signal and a horizontal synchronizing signal, and generates a reference clock having a predetermined frequency value which is synchronized with the vertical synchronizing signal. The one bit type control waveform generation circuit of the embodiment further comprises limit data latch means for storing a vertical period count limit value as a count limit value used for the vertical synchronizing signal. The decoder means generates an address count clock which is in synchronism with the reference clock. The value of the address count clock is reset based on the horizontal synchronizing clock signal. The address counter means counts the number of the address count clock from the decoder means. The counted value from the address counter means is reset based on the vertical synchronizing signal. The comparator means compares the counted value from the address counter means with the vertical synchronous count limit value and halts the transmission of the reference clock to the decoder means when both the counted value and the vertical synchronous count limit value are equal to each other. The memory means reads the counted value as an address data item from the address counter means and reads out one byte data item which has already been stored in a memory field addressed by the counted value. The readout conversion means comprises one byte latch means for receiving the a byte data item from the memory means based on the address count clock as a data latch timing transmitted from decoder means and for storing the received byte data item, shift register means for converting the byte data item stored in the one byte latch means based on the reference clock to a bit data item, one bit latch means for storing the bit data item transmitted from the shift register means based on the reference clock, and analogue conversion means for converting the bit data item in a digital form stored in the one bit latch means to an analogue signal, for generating an optimum control waveform and for transmitting the generated control waveform to outside. Thus, the one bit type control waveform generation circuit of the present invention has a configuration of a small circuit size and can efficiently provide various types of vertical control waveforms to be used for many kinds of drive circuits.

In accordance with another preferred embodiment of the present invention, the one bit latch means comprises a first flip flop for receiving the reference clock to operate, a first NOR circuit for receiving an output signal from the first flip flop and the reference clock, a second NOR circuit for receiving the reversed signal of the output signal from the first flip flop and the reference clock to operate, a second flip flop for latching a one bit data item from the shift register means based on the output from the first NOR circuit as a timing signal and a third flip flop for latching the bit data item transmitted from the shift register means based on the output from the second NOR circuit as a timing signal. The one bit latch means provides addition signals and subtraction signals to drive the analogue conversion circuit.

In accordance with another preferred embodiment of the present invention, the analogue conversion means comprises an addition subtraction circuit for receiving the addition signal from the second flip flop as a reversed signal and the subtracted signal from the third flip flop as a non-reversed signal and for executing an addition operation and a subtraction operation at the same time, an integral circuit for receiving the output signal from the addition subtraction circuit as a reversed signal, and a voltage follower circuit for receiving the output from the integral circuit as a non-reversed signal and for generating a control waveform which may be provided to drive circuits.

In accordance with another preferred embodiment of the present invention, the one bit type control waveform generation circuit further comprises write-in permission means for permitting a data replace operation to replace data items stored in the memory means with new data items while a blanking signal to erase the retrace line of a scanning line is received. The write-in permission means executes the data replace operation during a picture displaying period performed based on the control waveforms without causing distortion of displayed pictures.

In accordance with another preferred embodiment of the present invention, the memory means stores a direct current component and an alternating current component of a byte data item into different memory fields addressed by different addresses, respectively. The decoder means generates address count clocks for the direct current component and the alternating current component in synchronism with the reference clock. The one bit type control waveform generation circuit further comprises address switching means for switching alternately the address count clocks for the direct current component and the alternating current component, one byte latch means for receiving the address count clock for the direct current component transmitted from the decoder means as a latch timing clock and stores a one byte data item, namely the direct current component, from the memory means, and the D/A conversion means for converting the direct current component of a digital form to an analogue signal of an analogue form and for determining optionally a voltage as a starting voltage by using the direct current component and a voltage used after the starting voltage by using the alternating current component to generate a control waveform having a large dynamic range which can be changeable per period.

In accordance with another preferred embodiment of the present invention, the one bit type control waveform generation circuit further comprises digital output period permission circuit for receiving a permission pulse signal to control a period to supply a bit data item from the one bit latch means to the analogue conversion means and for controlling to provide the bit data item to the analogue means during the receiving of the permission pulse signal and for generating an optional control waveform having a uniform pulse-height value according to the change of the frequency of the synchronizing signal while pictures are displayed on a CRT based on the control waveforms. This can prevent occurrences of picture distortion caused by the change of the frequency of the horizontal or vertical synchronizing signal.

In accordance with another preferred embodiment of the present invention, the one bit type control waveform generation circuit further comprises reversed clock generation means for receiving the reference clock having a predetermined frequency value transferred from the reference clock generation means and for generating and providing a reversed clock of the reference clock, a second one byte latch means for receiving the byte data item from the memory means based on the address count clock as a data latch timing transmitted from decoder means and for storing the received byte data item based on the address count clock, second shift register means for converting the byte data item stored in the second one byte latch means based on the reversed clock to a bit data item, and second one bit latch means for temporarily storing the bit data item transmitted from the second shift register means based on the inverted clock. The analogue conversion means generates a control waveform based on the outputs from the one bit latch means and the second one bit latch means. Thus, the resolution of the control waveform per bit can be improved during a picture display period on a CRT based on the control waveform transmitted from the analogue conversion means.

In accordance with another preferred embodiment of the present invention, the reference clock generation means receives a synchronizing signal and generates a reference clock having a desired frequency value in synchronism with the synchronizing signal. The one bit type control waveform generation means further comprises reversed clock generation means for receiving the reference clock having a desired frequency value transmitted from the reference clock generation means and for generating and providing a reversed clock of the reference clock. The limit data latch means stores a period count limit value as a count limit value used for the synchronizing signal. The decoder means generates an address count clocks used for the direct current component and the alternating current component in synchronism with the reference clock. The address count clocks for the direct current component and the alternating current component are reset based on the synchronizing signal. The one bit type control waveform generation means further comprises address switching means for switching alternately the address count clocks for the direct current component and the alternating current component transmitted from the decoder means, address counter means for counting the number of the address count clocks transferred from the address switching means in which the counter value is reset based on the synchronizing signal, memory means for storing a direct current component and an alternating current component of a byte data item into different memory fields addressed by different addresses and for reading out a byte data items that has already been stored in the memory itself when receiving the address counted value as addresses transferred from the address counter means, one byte latch means located for each of the direct current component and the alternating current component for receiving the address count clocks transmitted from the decoder means as a latch timing clock and for storing a one byte data item from the memory means based on the address count clock, shift register means located for each of the direct current component and the alternating current component for converting the byte data item stored in the one byte latch means based on the reference clock and the reversed clock to a bit data item, one bit latch means located for each of the direct current component and the alternating current component for storing the bit data item transmitted from corresponding to the shift register means based on the reference clock and the reversed clock, analogue conversion means for converting the bit data item in a digital form stored in the one bit latch means to an analogue signal, write-in permission means for permitting a data replace operation to replace data items stored in the memory means with new data items while a blanking signal in order to erase the retrace line of a scanning line is received, one bit latch means for direct current component for receiving the address count clock for the direct current component from the decoder means as a latch timing and for storing the data item of the direct current component from the memory means, a digital/analogue (D/A) conversion means for converting the byte data item stored in the one byte latch means for the direct current component to an analogue signal, and digital output period permission means located between the one bit latch means and the analogue conversion means for receiving a permission pulse signal to control a period to supply a bit data item from the one bit latch means to the analogue conversion means and for controlling to provide the bit data item to the analogue means during the receiving the permission pulse signal and for generating an optional control waveform having an uniform pulse-height value according to the change of the frequency of the synchronizing signal while pictures are displayed on a CRT based on the control waveforms. The one bit type control waveform generation circuit adds the control waveform from the analogue conversion means and the output from the D/A conversion means and generates optional control waveform and provides it to outside. The one bit type control waveform generation circuit can prevent to generate picture distortion caused by the change of the frequency of the horizontal or vertical synchronizing signal and can control the vertical component in the control waveform per period and can generate optional control waveforms having a uniform pulse-height value according to the change of the frequency of the synchronizing signal while pictures are displayed on a CRT based on the control waveforms and can improve the resolution of the control waveform and can control the pulse-height value of the control waveform at a high accuracy.

BRIEF DESCRIPTION OF THE DRAWINGS

These and other objects, features, aspects and advantages of the present invention will become more apparent from the following detailed description of the present invention when taken in conjunction with the accompanying drawings, in which.

DESCRIPTION OF THE PREFERRED EMBODIMENTS

Other features of this invention will become apparent through the following description of preferred embodiments which are given for illustration of the invention and are not intended to be limit thereof.

Preferred embodiments of a one bit type control waveform generation circuit according to the present invention will now be described with reference to the drawings.

Embodiment 1

Figure 1:
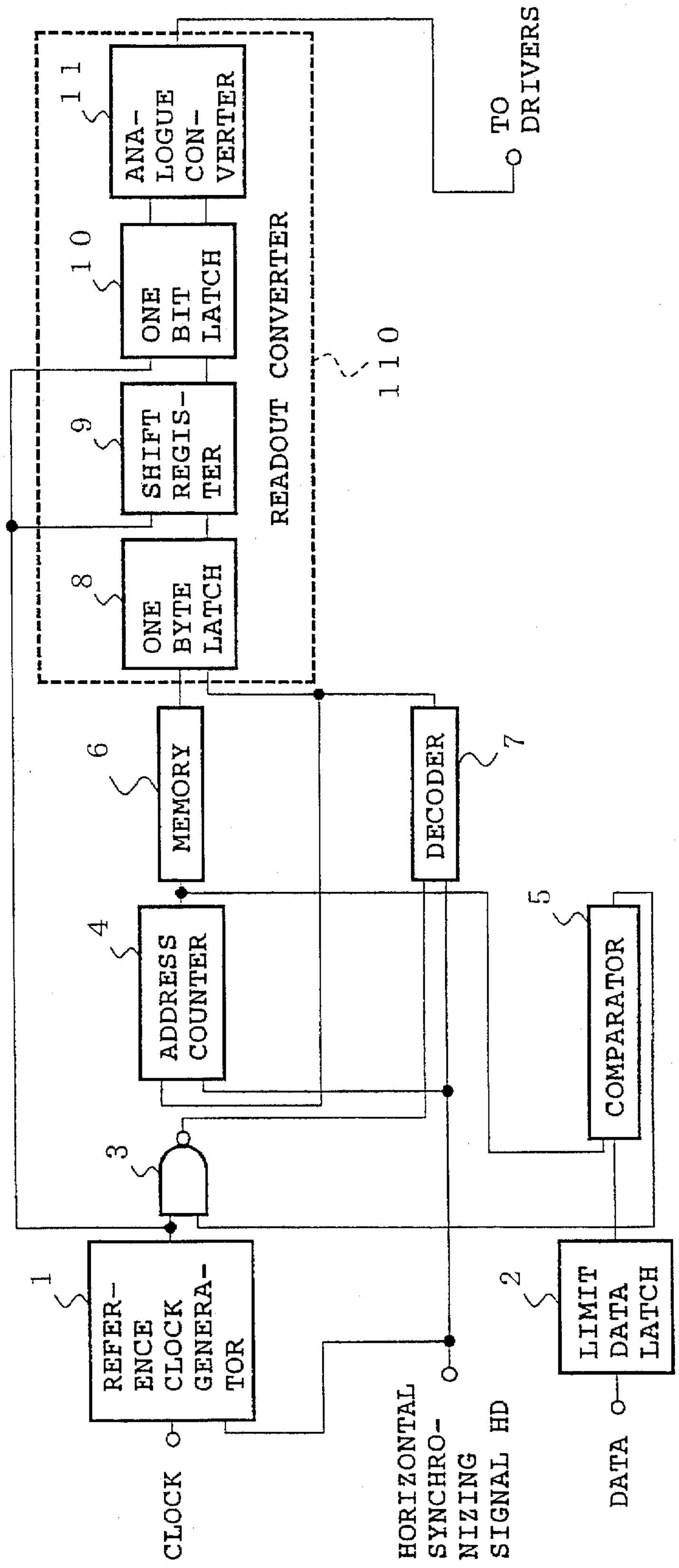
FIG. 1 is a block diagram showing a configuration of the one bit type control waveform generation circuit as the first embodiment according to the present invention.

FIG. 1 is a block diagram showing a configuration of the one bit type control waveform generation circuit as the first embodiment according to the present invention. In the diagram, reference number 1 designates a reference clock generation circuit (reference clock generation means) for receiving a horizontal synchronizing signal HD and for generating a reference clock having a predetermined frequency value in synchronism with the horizontal synchronizing signal, 2 denotes a limit data latch circuit (limit data latch means) for setting a count limit value used for limiting a counted value stored in an address counter (address counter means) 4, which will be described later, and for temporarily storing the count limit value, 3 indicates a NAND circuit for receiving output signals, for performing the NAND circuit itself, from the reference clock generator circuit 1 and a comparator (comparator means) 5 which will be described later, and 4 designates an address counter having a counter for counting the number of the address count clocks transmitted from a decoder (decoder means) 7, which will also be described later. The counted value stored in the address counter 4 is reset when it receives the horizontal synchronizing signal transmitted from outside.

Reference number 5 designates the comparator for comparing the counted value from the address counter 4 with the set data stored in the limit data latch 2 and for providing a control signal to the NAND circuit 3, a voltage potential of the control signal being changed from a high level to a low level when both the counted value and the count limit data stored in the limit data latch 2 are equal.

Reference number 6 indicates a memory means for receiving the counted value as an address data item transmitted from the address counter 4 and for providing a byte data item of a byte stored in the memory field addressed by the counted value, reference number 7 denotes the decoder for generating address count clock signals in synchronism with the reference clock having the predetermined frequency value transmitted through the NAND circuit 3. The value of the address count clock is reset by receiving the horizontal synchronizing signal.

Reference number 8 designates a one byte latch (one byte latch means) for receiving the address count clock as a latch timing transmitted from the decoder 7 and temporarily storing a byte data item from the memory 6 in synchronism with the address count clock, 9 denotes a shift register (shift register means) for receiving the reference clock having the predetermined frequency value transmitted from the reference clock generation circuit 1 and for converting the byte data item stored in the one byte latch 8 to bit data items and for providing the bit data item per bit, 10 designates a one bit latch circuit (one bit latch means) for temporarily storing the bit data item transmitted from the shift register circuit 9 in synchronism with the reference clock signal having the predetermined frequency value transmitted from the reference clock generation circuit 1.

Reference number 11 denotes an analogue conversion means (analogue conversion means) for converting the bit data item from the one bit latch circuit 10 to an analogue signal. Thus, the analogue conversion circuit 10 generates the analogue signals as horizontal control waveforms and provides the horizontal control waveforms to driver circuits (not shown) used for CRTs. The one byte latch circuit 8, the shift register 9, the one bit latch circuit 10, and the analogue conversion circuit form a readout conversion circuit (readout conversion means).

In the one bit type control waveform generation circuit of the first embodiment, the byte data items which have already been stored in the memory 6. Each of the bit data items in the byte date item from the memory 6 is provided per bit to analogue conversion circuit 11 through the one bit latch circuit 10 by the shift register circuit 9. Finally, the analogue conversion circuit 11 converts the bit data item transmitted from the one bit latch circuit 10 to an optional control waveform.

Next, the operation of the one bit type control waveform generation circuit of the first embodiment will be explained.

Figure 2B:
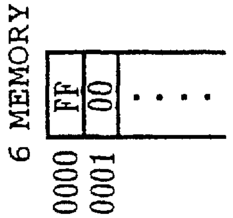
FIG. 2B is an explanatory diagram showing contents of the memory.
Figure 2A:
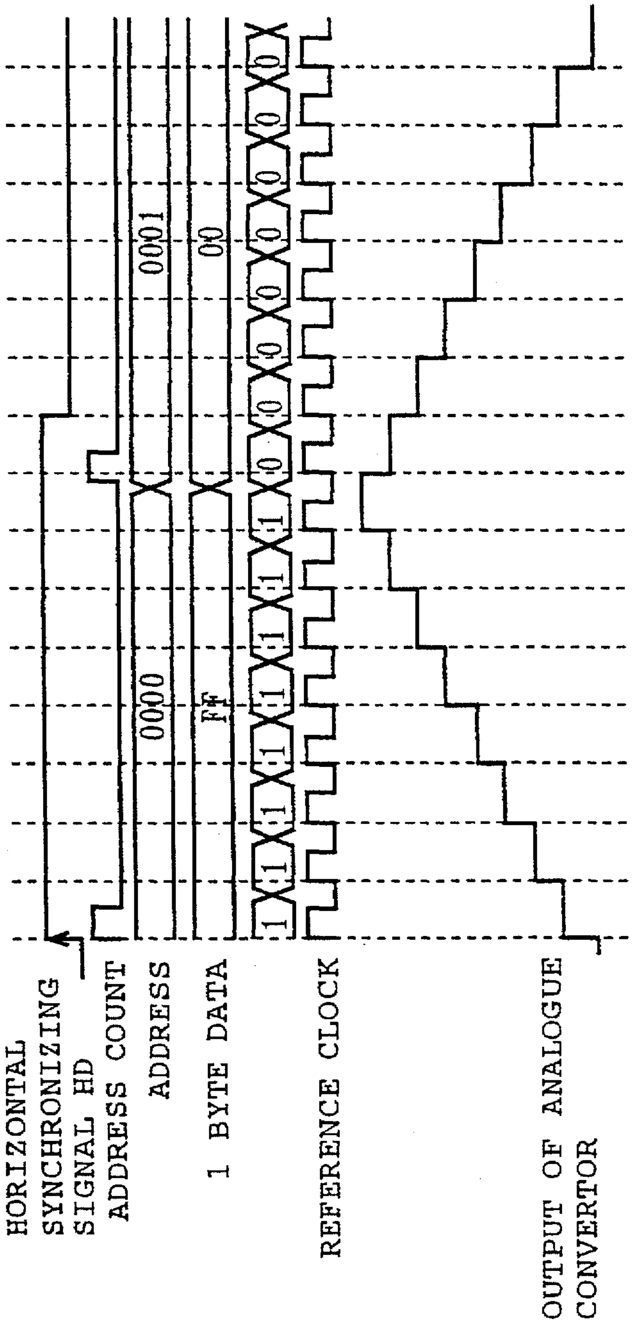
FIG. 2A is a timing chart showing operations of the one bit type control waveform generation circuit shown in FIG. 1.

FIG. 2A is a timing chart showing operations of the one bit type control waveform generation circuit of the first embodiment shown in FIG. 1.

The reference clock signal generation circuit 1 generates a reference clock having a predetermined frequency value by dividing the clock signal transmitted from outside in synchronism with the horizontal synchronizing signal. The address counter 4 receives the address count clock transmitted from the decoder 7 in synchronism with the reference clock having the predetermined frequency value and counts up a counted value by one based on the received address count clock.

Next, the memory 6 receives the output as an address data item transmitted from the address counter circuit 4 and reads out a byte data item stored in the memory 6 itself addressed by the address data item. The one byte latch circuit 8 receives the address count clock as a latch timing from the decoder 7 (the value of the address count clock is reset when the decoder 7 receives the horizontal synchronizing signal from outside), and temporarily stores the byte data item readout from the memory 6. At the same time when the one byte latch circuit 8 latches the byte data item, the shift register 9 converts the byte data item to bit data items and provides the bit data items per bit to the one bit latch circuit 10 in synchronism with the reference clock having the predetermined frequency value generated by the reference clock generation circuit 1.

The one bit latch circuit 10 temporarily stores the bit data item transmitted from the shift register 9 in synchronism with the reference clock from the reference clock generation circuit 1. At the same time, the analogue conversion circuit 11 converts the bit data item from the one bit latch circuit 10 to an analogue signal and generates a horizontal control waveform and provides it to the drivers (not shown) for CRTs.

On the other hand, the address count limit value in the limit data latch 2 has already been stored for limit the counting operation executed by the address counter 4. The comparator 5 compares the address count limit value stored in the limit data latch 2 with the counted value from the address counter 4. When both values are agreed, the comparator 5 generates a control signal whose voltage potential is changed from a high level to a low level and provides the generated control signal to the NAND circuit 3. Because the level of the control signal from the comparator 5 becomes the high level when both value are agreed, namely the NAND circuit 3 receives the control signal of the low level transmitted from the comparator 5, the decoder 5 does not transmit the address count clock to the address counter 4 and the one byte latch circuit 8 in synchronism with the reference clock from the reference clock generation circuit 1.

The transmission of the address count clock from the decoder 7 to the address counter circuit 4 in order to count up the counted value of the counter in the address counter 4 by one is halted. Further, the transmission of the address count clock from the decoder 7 to the one byte latch circuit 8 is also halted. In this case, no data item is read out from the memory 6. Based on the manners described above, optional control waveforms are generated in synchronism with the change of a frequency of the horizontal synchronizing signal HD. The generated horizontal control waveform is transferred from the one bit type control waveform generation circuit of the first embodiment to outside drivers (omitted from the drawings) for CRTs.

Operations and configurations of the one bit latch circuit 10 and the analogue conversion circuit 11 will be described in the description for the second embodiment in detail. In the second embodiment, the configurations and the operations of the one bit latch circuit 10 and the analogue conversion circuit 11 are same in the first and second embodiments.

As described above in detail, in the one bit type control waveform generation circuit of the first embodiment according to the present invention, a byte data item stored in the memory 6 is read out and separated into bit data items. Each of the bit data items separated by the shift register 9 and latched by the one bit latch circuit 10 is converted into an analogue signal by the analogue conversion circuit 11 in order to generate an optional horizontal control waveform. Therefore, the present invention can provide the one bit type control waveform generation circuit having a small size in circuit configuration.

Embodiment 2

Figure 3:
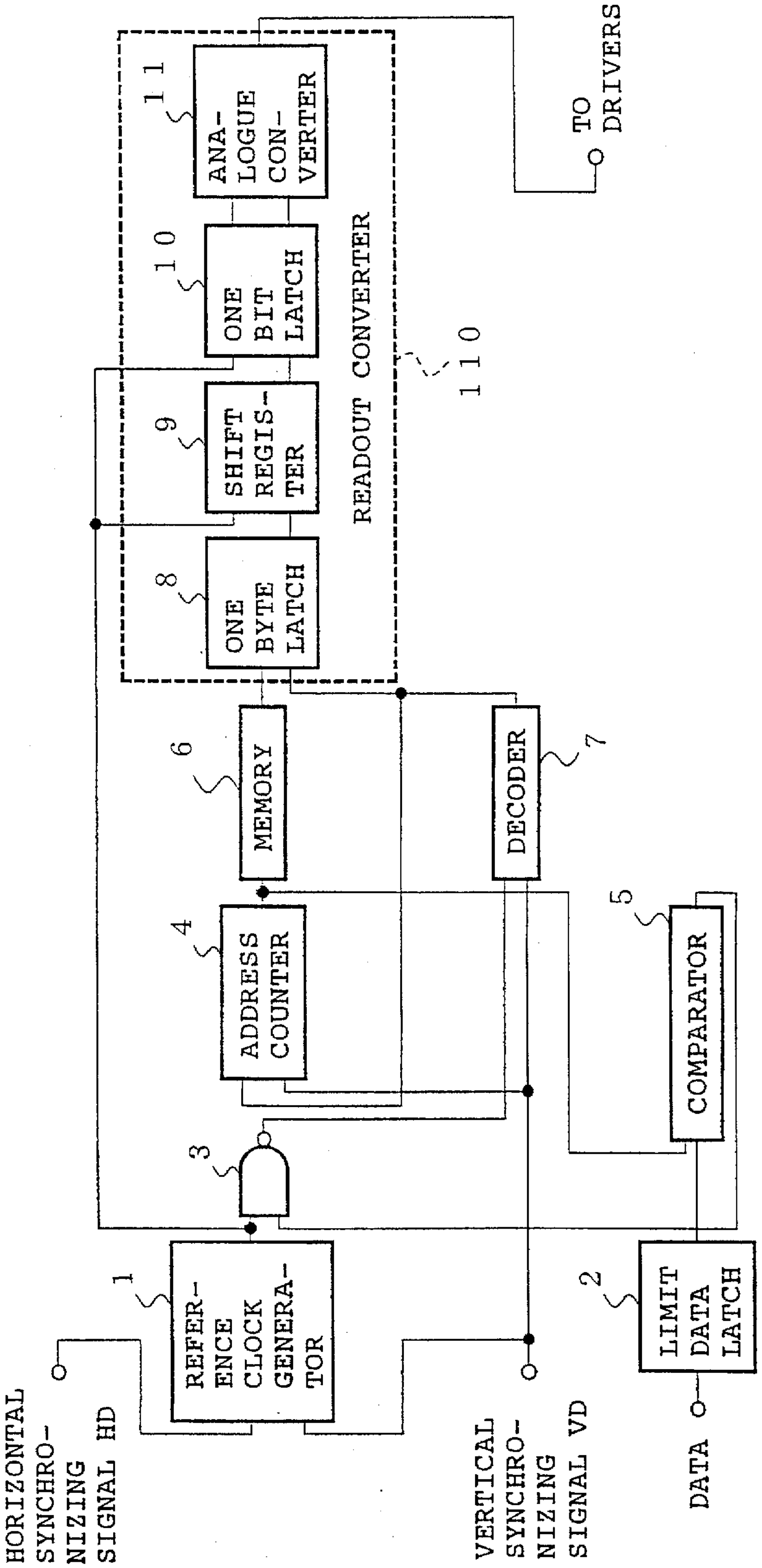
FIG. 3 is a block diagram showing a configuration of the one bit type control waveform generation circuit as the second embodiment according to the present invention.

FIG. 3 is a block diagram showing a configuration of the one bit type control waveform generation circuit as the second embodiment according to the present invention.

In the drawing, reference number 1 designates a reference clock generation circuit (reference clock generator) for receiving a horizontal synchronizing SD signal and a vertical synchronizing signal VD transferred from outside and for generating a reference clock having a predetermined frequency value which is in synchronism with the vertical synchronizing signal VD. One of input terminals of each of the address counter 4 and the decoder 7 receives the vertical synchronizing signal VD. The same reference numbers will be used for components which are equal to the components used in the first embodiment in operation and configuration, so the explanations for the components will be omitted here.

In the one bit type control waveform generation circuit as the first embodiment shown in FIG. 1, the horizontal control waveform is generated based on the horizontal synchronizing signal HD. In the one bit type control waveform generation circuit as the second embodiment shown in FIG. 3, the vertical control waveform is generated based on the vertical synchronizing signal VD.

Figure 5:
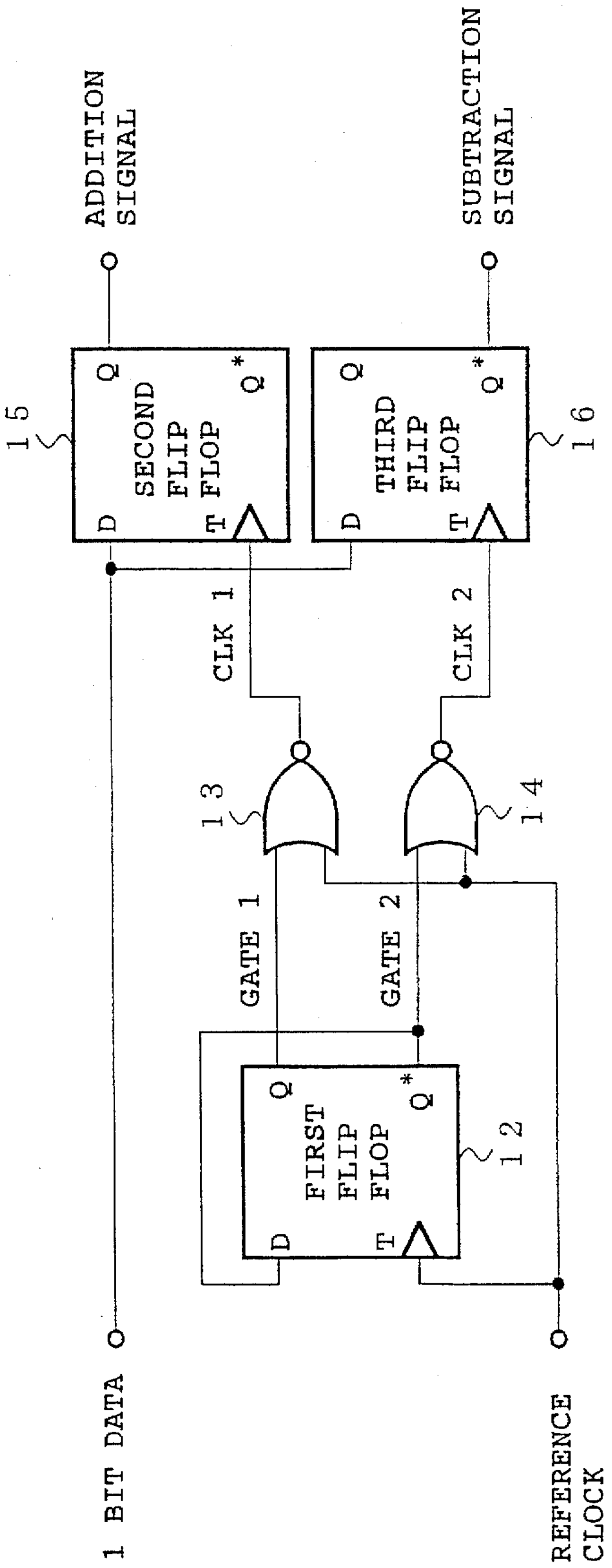
FIG. 5 is a block diagram showing a configuration of the one bit latch circuit incorporated in the one bit type control waveform generation circuit shown in FIGS. 1 and 3.

FIG. 5 is a block diagram showing a configuration of the one bit latch circuit incorporated in the one bit type control waveform generation circuits as the first and second embodiments shown in FIGS. 1 and 3. In the diagram, reference numbers 12, 15 and 16 designate a first flip flop, a second flip flop, and a third flip flop, respectively. Reference numbers 13 and 14 denote a first NOR circuit and a second NOR circuit, respectively.

The one bit latch circuit 10 receives a bit data item transmitted from the shift register 9 and the reference clock from the reference clock generation circuit 1 and generates an addition signal and a subtraction signal which operate the analogue conversion circuit 11.

Figure 7:
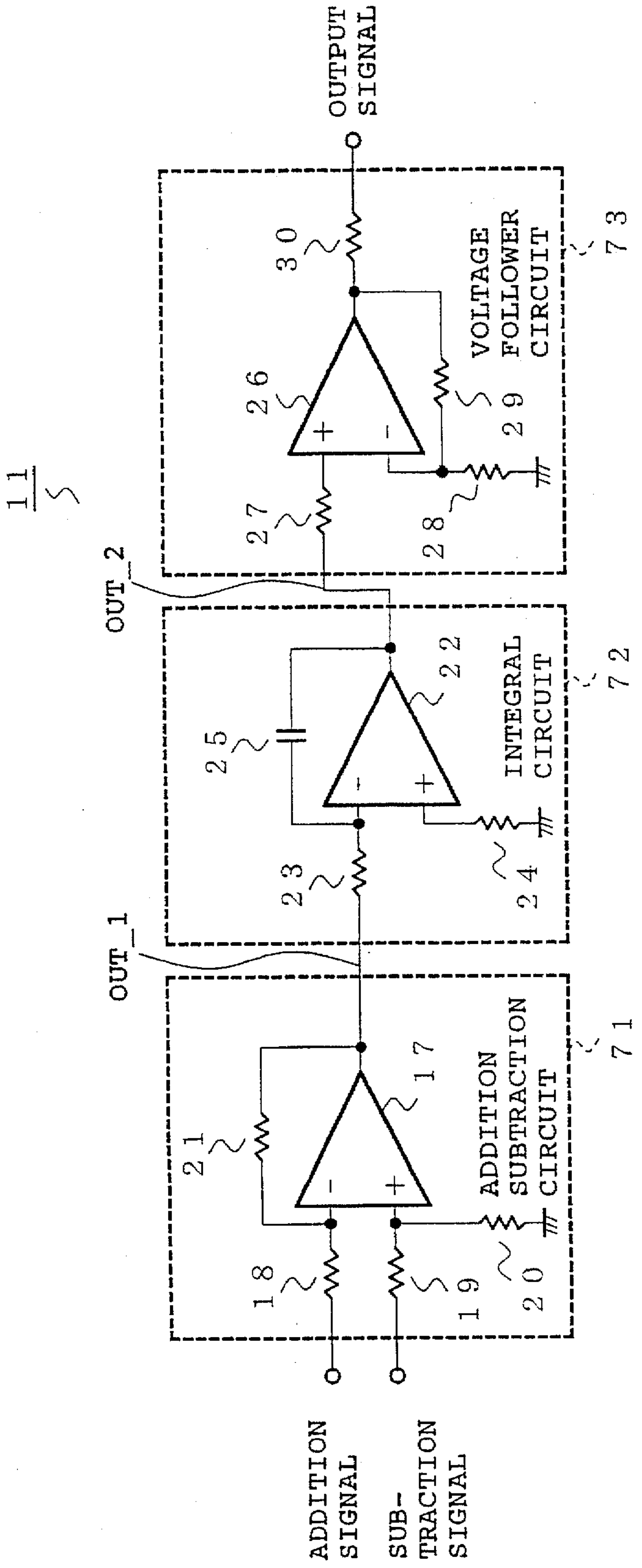
FIG. 7 is a block diagram showing a configuration of the analogue conversion circuit incorporated in the one bit type control waveform generation circuit shown in FIGS. 1 and 3.

FIG. 7 is a block diagram showing a configuration of the analogue conversion circuit incorporated in the one bit type control waveform generation circuits as the first and second embodiments shown in FIGS. 1 and 3. In the diagram, reference number 71 designates an addition subtraction circuit, 72 denotes an integration circuit, 73 indicates a voltage follower circuit, 17, 22 and 26 designate operational amplifiers, 18–21, 23 and 11 denote resistances, and 25 indicates a condenser.

The analogue conversion circuit 11 comprises the addition subtraction circuit 71, the integration circuit 72 and the voltage follower circuit 73.

The addition subtraction circuit 71 in the analogue conversion circuit 11 receives the addition signal and the subtraction signal transmitted from the one bit latch circuit 10 and generates addition subtraction signal OUT 1 whose level becomes a high level when the level of the subtraction signal is the high level and becomes a low level when the level of the addition signal is the high level.

The integration circuit 72 receives the addition subtraction signal OUT 1 from the addition subtraction circuit 71 and generates an integration waveform signal OUT 2 whose voltage level is decreased when the level of the addition subtraction signal OUT 1 is the high level and whose voltage level is increased when the level of the addition subtraction signal OUT 1 is the low level. The voltage follower circuit 73 receives the integration waveform OUT 2 transmitted from the integration circuit 72 and generates a control waveform whose voltage level is in proportion to the voltage level of the integration waveform signal OUT 2. Thus, the analogue conversion circuit 11 generates the horizontal control waveform and the vertical control waveform to control the operations of drive drivers (not shown).

Next, the operation of the one bit type control waveform generation circuit as the second embodiment will be explained.

Figure 4B:
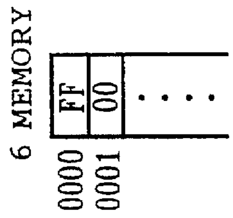
FIG. 4B is an explanatory diagram showing contents of the memory.
Figure 4A:
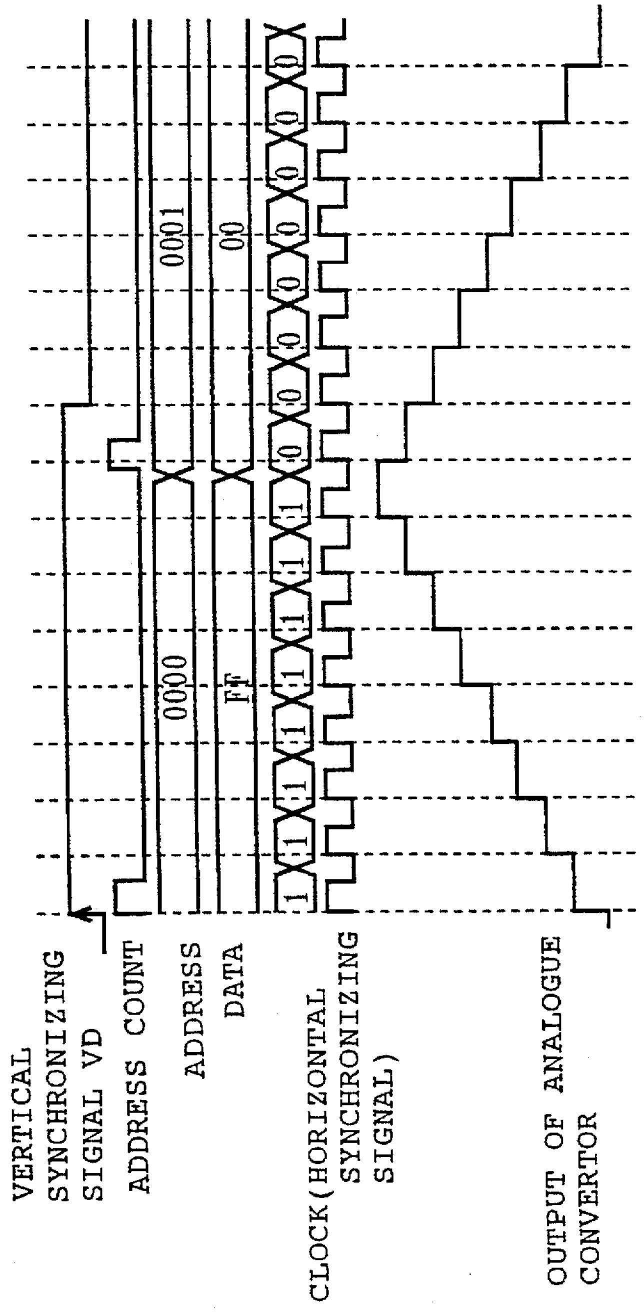
FIG. 4A is a timing chart showing operations of the one bit type control waveform generation circuit shown in FIG. 3.

FIG. 4A is a timing chart showing the operations of the one bit type control waveform generation circuit of the second embodiment shown in FIG. 3.

The reference clock generation circuit 1 receives the horizontal synchronizing signal HD and the vertical synchronizing signal VD as the reference clocks and divides the horizontal synchronizing signal HD to generate the reference clock having a predetermined frequency value. Other operations of the components in the one bit type control waveform generation circuit of the second embodiment are same as those of the one bit type control waveform generation circuit as the first embodiment. That is, optional control waveforms are generated according to the change of frequency of the vertical synchronizing signal VD and provides it to the drivers (not shown).

Figure 6:
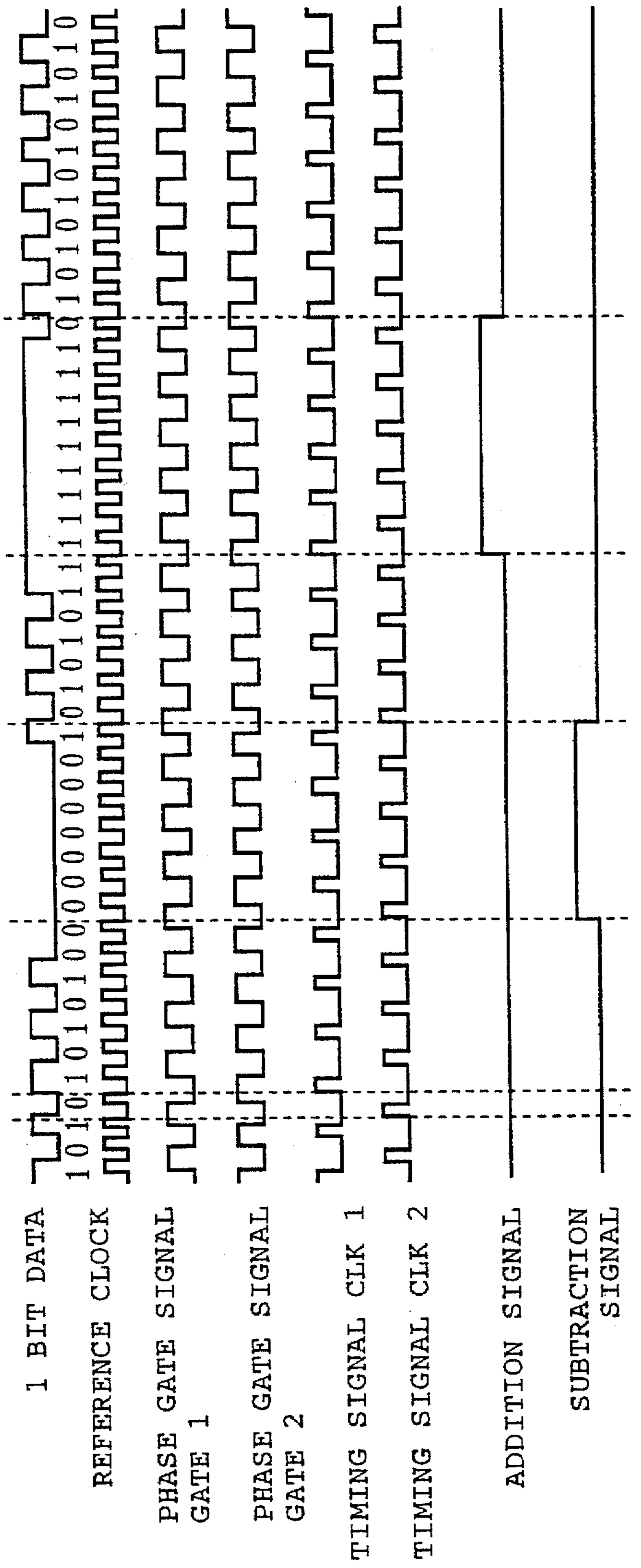
FIG. 6 is a timing chart showing operations of the one bit latch circuit shown in FIG. 5.

FIG. 6 is a timing chart showing the operations of the one bit latch circuit 10 shown in FIG. 5.

The one bit latch circuit 10 receives a bit data item transferred from the shift register 9 and generates the addition signal and the subtraction signal to drive the analogue conversion circuit 11. FIG. 6 shows the timing relationship between the reference clock, the bit data item transmitted from the shift register 9, and the addition signal and the subtraction signal. The first flip flop 12 generates phase gate signals GATE 1 and GATE 2 based on the received reference clock. Next, the first NOR circuit 13 generates a timing clock signal CLK 1 by gating the reference clock based on the phase gate signals GATE 1 and GATE 2. The second NOR circuit 14 generates a timing clock signal CLK 2 by gating the reference clock based on the phase gate signal GATE 2. The second flip flop circuit 15 latches a bit data item received based on the timing clock signal CLK 1 and generates and provides the addition signal.

On the other hand, the third flip flop 16 latches the a bit data item received based on the timing clock signal CLK 2 and generates and provides the subtraction signal.

As shown in the timing chart of FIG. 6, a bit data item becomes three cases such as "1010" or "0101", "0000", or "1111".

When the bit data item is "1010" or "0101", both the addition signal and the subtraction signal become a zero level (constant state), when "0000", the level of the addition signal becomes the zero level (increasing level) and the level of the subtraction signal becomes 1 level (decreasing state). When the bit data item is "1111", the level of the addition signal becomes the 1 level (decreasing level) and the subtraction signal become the zero level (increasing state).

Figure 8:
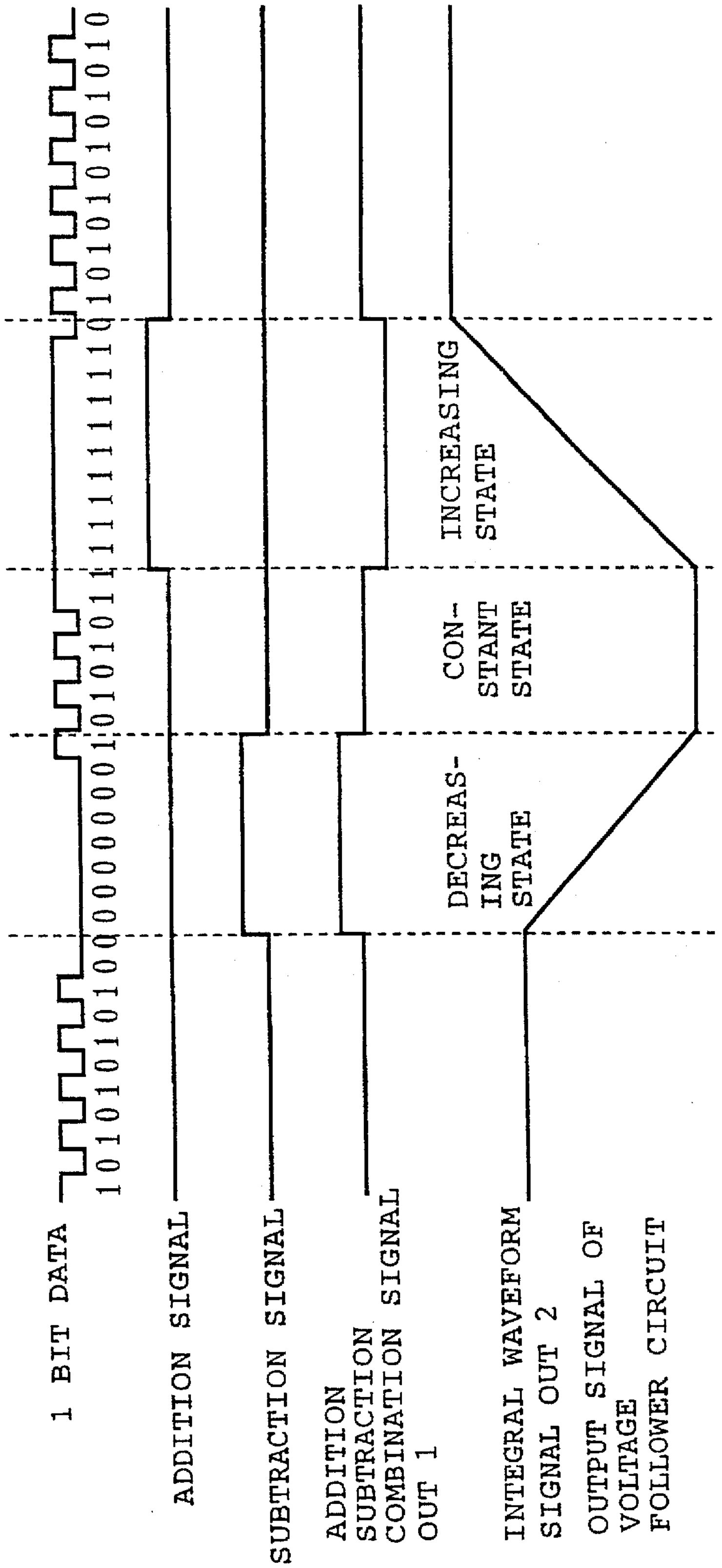
FIG. 8 is a timing chart showing operations of the analogue conversion circuit shown in FIG. 7.

FIG. 8 is a timing chart showing the operations of the analogue conversion circuit 11 shown in FIG. 7. FIG. 8 shows the relationship between the addition signal, the subtraction signal, and the control waveform output signal as output signal from the analogue conversion circuit 11.

The analogue conversion circuit 11 receives the addition signal and the subtraction signal transmitted from the one bit latch circuit 10 and generates the output control waveform to drive the drive circuits (not shown).

The addition subtraction circuit 71 comprising the operational amplifier 17 and the resistances 18–21 receives the addition signal and the subtraction signal transmitted from the one bit latch circuit 10 and generates the addition subtraction signal OUT 1. The integration circuit 72 receives the addition subtraction signal OUT 1 and generates the integrated waveform signal OUT 2. When the level of the addition subtraction signal OUT 1 is the high level, namely when the bit data item becomes "0000", the integrated waveform signal OUT 2 enters the decreasing state, and when ±0 level, namely when the bit data item is "1010" or "0101", the integrated waveform signal OUT 2 enters the constant state, and when −1 level, namely when the bit data item becomes "1111", the integrated waveform signal OUT 2 enters the increasing state.

Thus, an optional integrated waveform signal can be generated by using the pattern of the signal of a bit data item. The generated optional integrated waveform signal is transferred to the voltage follower circuit 73. The voltage follower circuit 73 comprising the operational amplifier 26, and the resistances 27 to 30 and converts the received integrated waveform signal OUT 2 by using an impedance conversion to generate control waveforms. These control waveforms are provided to outside such as drivers (not shown).

As described above in detail, in the one bit type generation circuit of the second embodiment according to the present invention, a byte data item stored in the memory 6 is separated into bit data items. The analogue conversion circuit 11 converts each of the bit data items to an analogue signal per each of the bit data items in order to generate optional vertical control waveforms. Thereby, the present invention can provide the one bit type control waveform generation circuit having a small size in circuit configuration, because it is not required to incorporate a memory and a D/A converter for each control waveform to be required.

Embodiment 3

Figure 9:
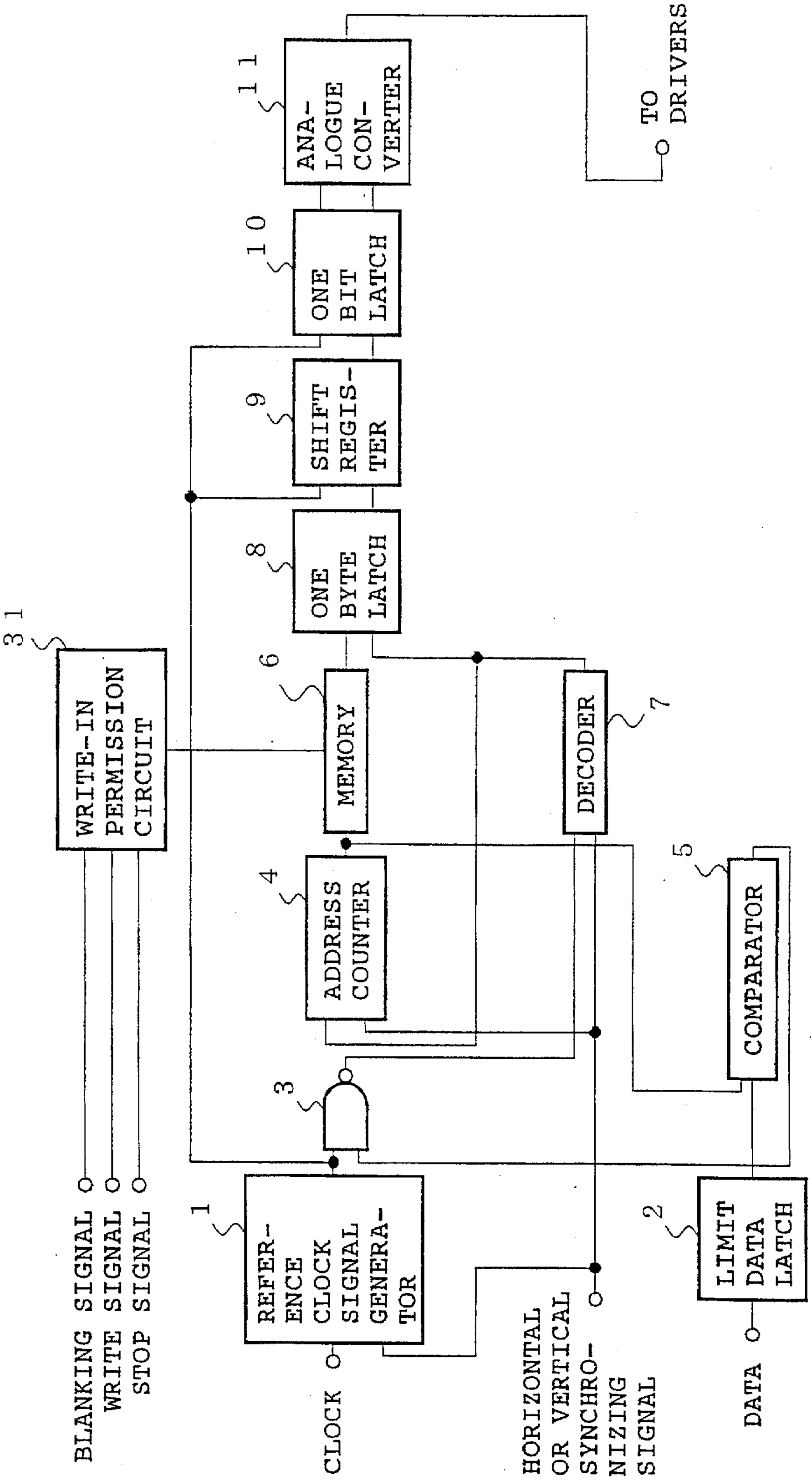
FIG. 9 is a block diagram showing a configuration of the one bit type control waveform generation circuit as the third embodiment according to the present invention.

FIG. 9 is a block diagram showing a configuration of the one bit type control waveform generation circuit as the third embodiment according to the present invention.

In the diagram, reference number 31 designates a write-in permission circuit (write-in permission means) 31 for control the operation in which the data items stored in the memory 6 are replaced while a blanking signal to erase the retrace line of a scanning line becomes the high level.

The same reference numbers used in the one bit type control waveform generation circuit of the first and second embodiments shown in FIGS. 1 and 3 are used for components in the one bit type control waveform generation circuit of the third embodiment. Therefore the explanations of them are omitted here for brevity.

In the third embodiment, the write-in permission circuit 31 receives the blanking signal to erase the retrace line of a scanning line and executes the memory data replace operation while the level of the blanking signal is the high level. Thereby, the generation operation of control waveforms can be executed efficiently.

The operations which are the same of the operations used in the first and second embodiments shown in FIGS. 1 to 4 are omitted here for brevity.

Figure 10:
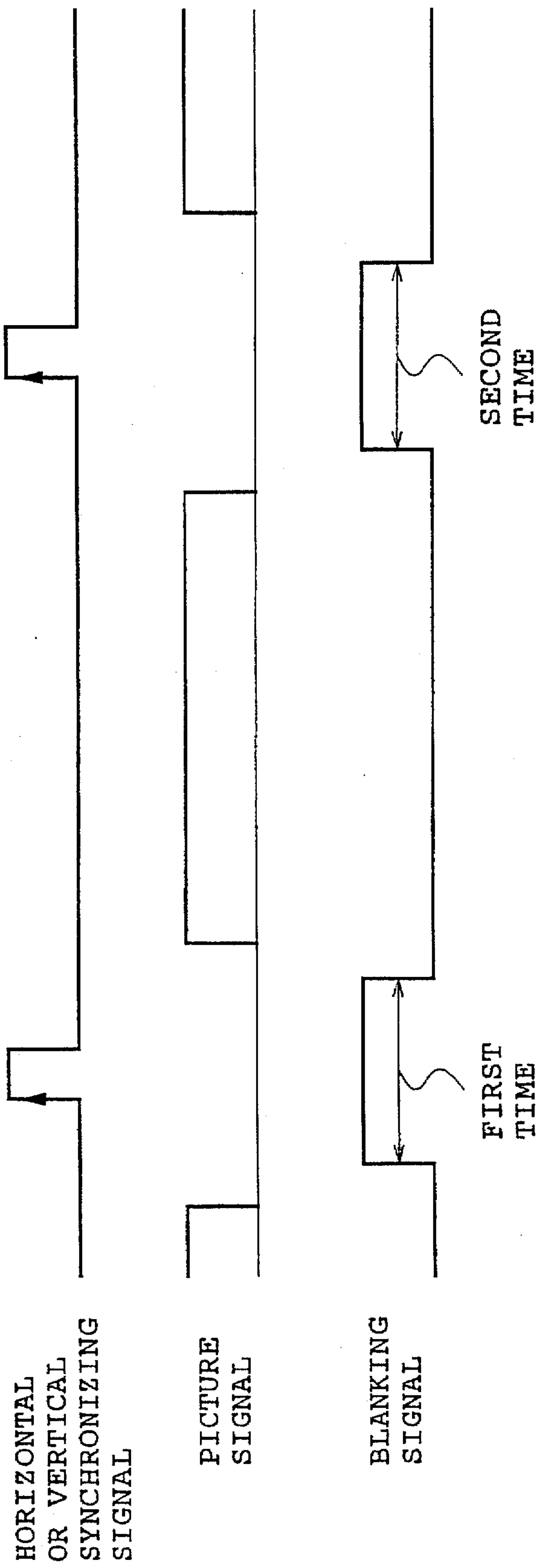
FIG. 10 is a timing chart showing operations of the one bit type control waveform generation circuit shown in FIG. 9.

FIG. 10 is a timing chart showing a memory data replacing operation of the one bit type control waveform generation circuit of the third embodiment shown in FIG. 9.

The write-in permission circuit 31 receives the blanking signal used for erasing the retrace line of a scanning line on a CRT (not shown) and executes the memory data replacing operation while the level of the blanking signal is the high level.

First, the write-in permission circuit 31 receives a write signal, transmitted from a microcomputer (not shown), indicating the memory data replacing operation by which the data items stored in the memory 6 are replaced with new data items. Next, the write-in permission circuit 31 executes the memory data replacing operation during the first blanking period in which the level of the blanking signal is the high level. Thereby, the data items stored in the memory 6 are replaced with the data items that are newly transmitted from outside.

When the memory write-in operation does not be completed during the first blanking period, the write-in permission circuit 31 transmits a stop signal to the microcomputer (not shown). The microcomputer receives the stop signal from the write-in permission circuit 31 and then the write-in permission circuit 31 halts the execution of the memory write-in operation to the memory 6.

The microcomputer (not shown) holds data items which have not been stored into the memory 6. Then, the write-in permission circuit 31 executes the memory write-in operation for the remained data items to the memory 6 during a second blanking period.

As described above in detail, in the one bit type control waveform generation circuit of the third embodiment, since the data items stored in the memory 6 can be replaced with new data items by the write-in permission circuit 31 during the transmission of the blanking signal to erase the retrace line of a scanning line on a CRT, it can be avoided to cause the distortion of pictures displayed on a CRT (not shown). Thus, the present invention can provide the one bit type control waveform generation circuit for efficiently performing the adjusting process for a control waveform generation process.

Embodiment 4

Figure 11:
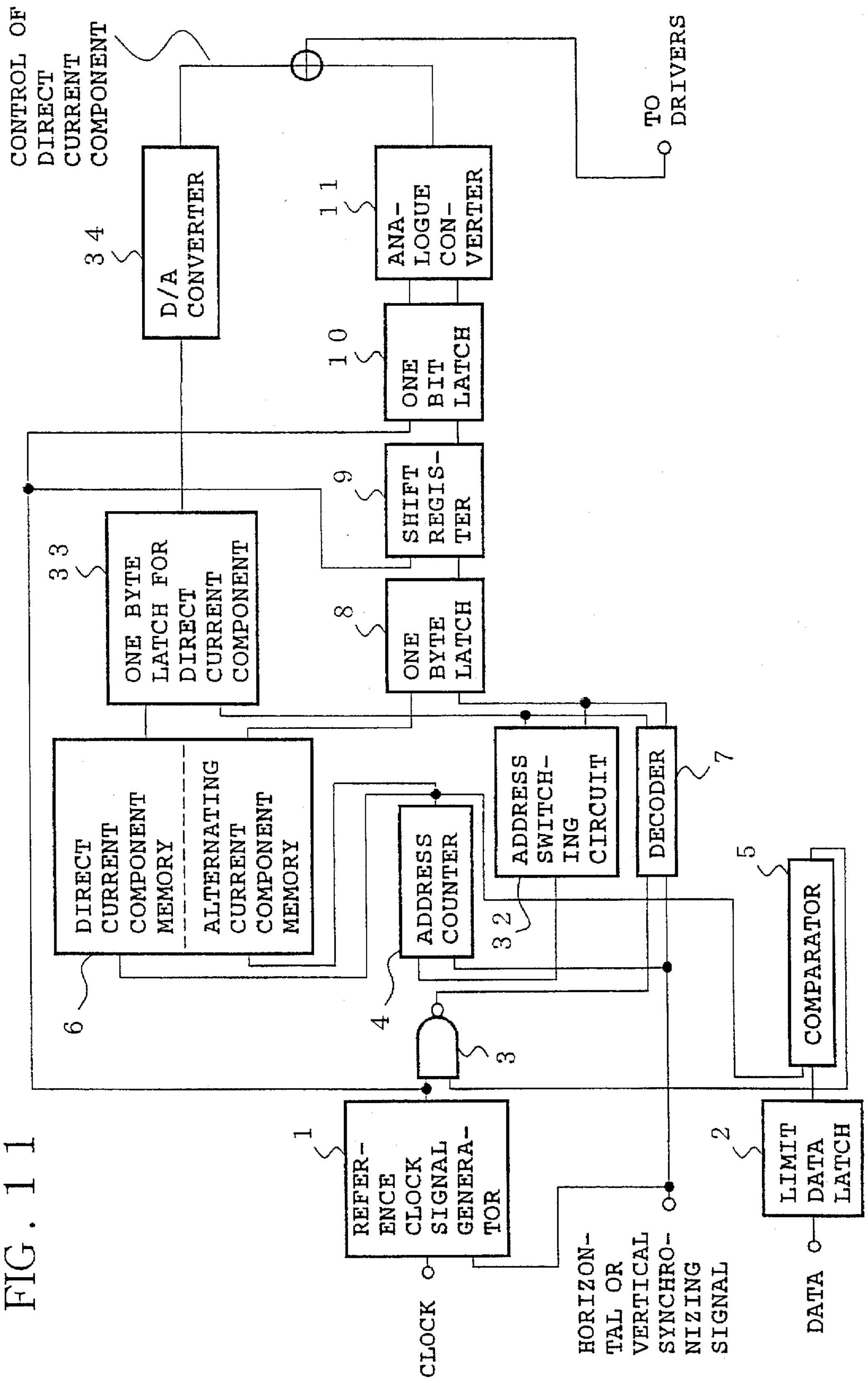
FIG. 11 is a block diagram showing a configuration of the one bit type control waveform generation circuit as the fourth embodiment according to the present invention.

FIG. 11 is a block diagram showing a configuration of the one bit type control waveform generation circuit as the fourth embodiment according to the present invention.

Figures 12A, 12B:
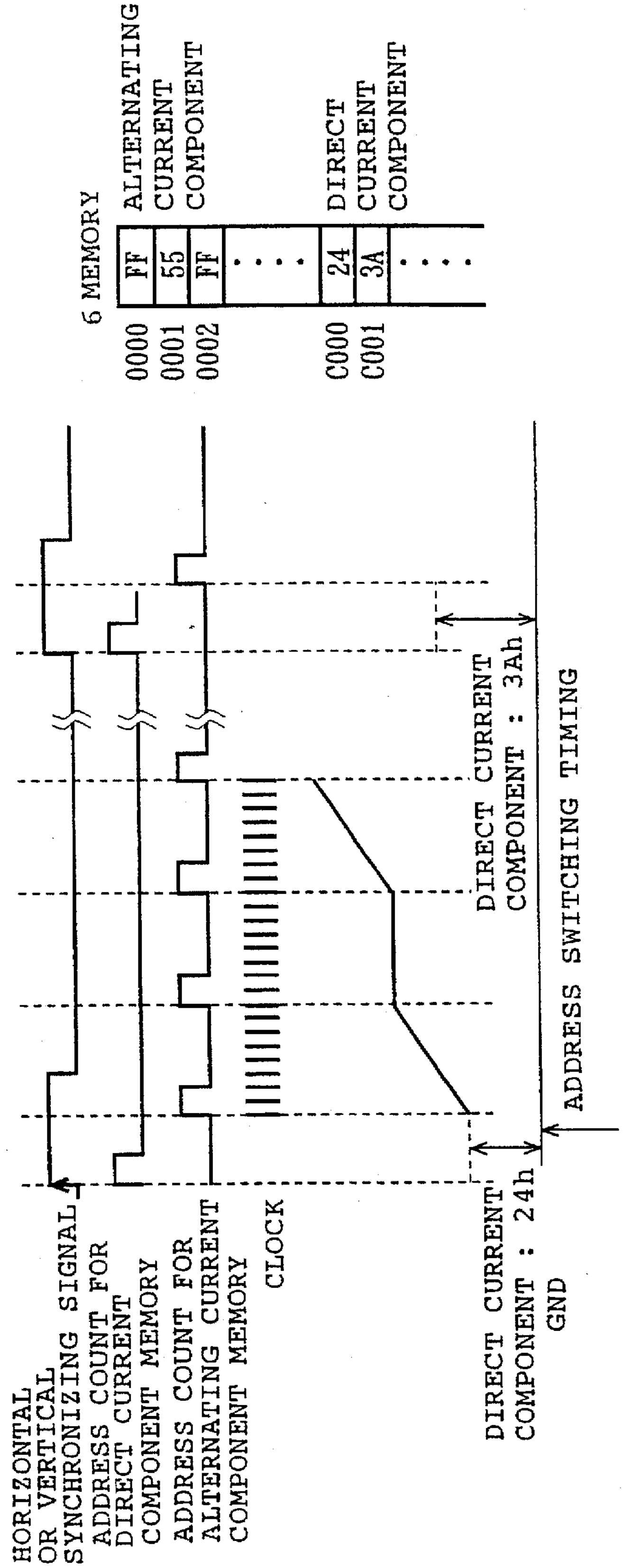
FIG. 12A is a timing chart showing operations of the one bit type control waveform generation circuit shown in FIG. 11.
FIG. 12B is an explanatory diagram showing contents of the memory.

In the diagram, reference number 6 designates the memory for receiving a counted value as an address data item addressing a memory field transmitted from the address counter 4 and reads out a desired byte data item from the memory 6 itself and provides the byte data. The byte data item comprises a direct current component and an alternating current component which are stored into different memory fields addressed by different address data items, respectively. For example, as shown in FIG. 12B, alternating current components are stored into memory fields whose starting address is "0000" and direct current components are stored into memory fields whose starting address is "C000".

Reference number 7 designates the decoder for receiving the reference clock having a predetermined frequency value transmitted from the reference clock generation circuit 1 and a horizontal synchronizing signal or a vertical synchronizing signal and for generating address count clocks corresponding to the direct current component and the alternating current component in synchronism with the reference clock. The address counter clocks described above are reset by receiving the synchronizing signal. Reference number 32 designates an address switching circuit (address switching means) for switching one of the address count clocks for the direct current component and the alternating current component transmitted from the decoder 7. Reference number 8 denotes the one byte latch circuit for receiving the address count clock according to the alternating current as a latch timing clock and for temporarily storing the alternating current component data item transmitted from the memory 6, 33 designates a one byte latch circuit (one byte latch means) for temporarily storing a byte data item of the direct current component from the memory 6.

Reference number 9 indicates the shift register for converting the byte data item of the alternating current component transmitted form the one byte latch 8 into bit data items in synchronism with the reference clock from the reference clock generation circuit 1, 11 designates the analogue conversion circuit for converting the bit data item of a digital form from the one bit latch circuit 10 into an analogue signal, 34 designates a D/A converter (D/A conversion means) for converting the byte data item of the direct current component from the one byte latch 33 for the direct current component into an analogue data item. The same reference numbers used in the one bit type control waveform generation circuit of the first and second embodiments shown in FIGS. 1 and 3 are used for components in the one bit type control waveform generation circuit of the third embodiment. Therefore the explanations of them are omitted here for brevity.

In the embodiment 4, data items are separated ahead of time into the direct current component and the alternating current component and then stored into the memory 6 addressed by different addresses. For example, a starting voltage is optionally determined by using the direct current component and a voltage after the starting voltage is generated by using the alternating current component, so that control waveforms having a large dynamic range whose form are changed per period can be generated.

Next, the operation of the one bit type control waveform generation circuit of the fourth embodiment will be explained. FIG. 12A is a timing chart showing the operations of the one bit type control waveform generation circuit of the fourth embodiment shown in FIG. 11. The operations which are the same of the operations used in the first and second embodiments shown in FIGS. 1 to 4 are omitted here for brevity.

First, the one byte latch 8 receives the address count clock, as a latch timing clock, of the alternating current component transmitted from the decoder 7 and temporarily stores a byte data item of the alternating current component stored in the memory 6. The one byte latch 33 for the direct current component receives the address count clock, as a latch timing clock, of the direct current component transmitted from the decoder 7 and temporarily stores a byte data item of the direct current component stored in the memory 6.

The address count clocks for the alternating current component and the direct current component are switched by the address switching circuit 32 by using the horizontal synchronizing signal or the vertical synchronizing signal as a trigger. The alternating current component data item which is temporarily stored in the one byte latch 8 is transmitted to the shift register 8 in synchronism with the reference clock having the predetermined frequency value from the reference clock generation circuit 1. The shift register 9 converts the received the byte data item of the alternating current component into bit data items. The one bit latch circuit 10 receives the bit data item of the alternating current component from the shift register 9 per bit in synchronism with the reference clock and temporarily stores the bit data item. When the one bit latch 10 stores the one bit data item, the analogue conversion circuit 11 receives the one bit data item from the one bit latch 10 and converts it to an analogue signal of an alternating current component.

On the other hand, the one byte data item of the direct current component which is temporarily stored in the one byte latch 33 is converted to an analogue signal by the D/A converter 34 that can convert a digital signal to an analogue signal. Thereby, the starting voltage of the direct current component can be generated by the D/A converter 34.

Finally, the one bit type control waveform generation circuit of the fourth embodiment adds the starting voltage of the direct current component from the D/A converter 34 and the analogue signal of the alternating current component from the analogue conversion circuit 11 to generate an optional control waveform. This control waveform is provided to drivers (not shown). Thereby, a pattern adjusting operation for the optional control waveform whose pattern can be changeable per period is performed.

As described above, in the one bit type control waveform generation circuit of the fourth embodiment, data items to be stored into the memory 6 are separated into a direct current component and an alternating current component. The direct current component and the alternating current component are stored into memory fields whose addresses are different to each other. For example, a starting voltage is generated by using the direct current component and a voltage used after the starting voltage is generated by using the alternating current component. Thereby, a pattern adjusting operation for the optional control waveform whose pattern can be changeable per period is performed.

Embodiment 5

Figure 13:
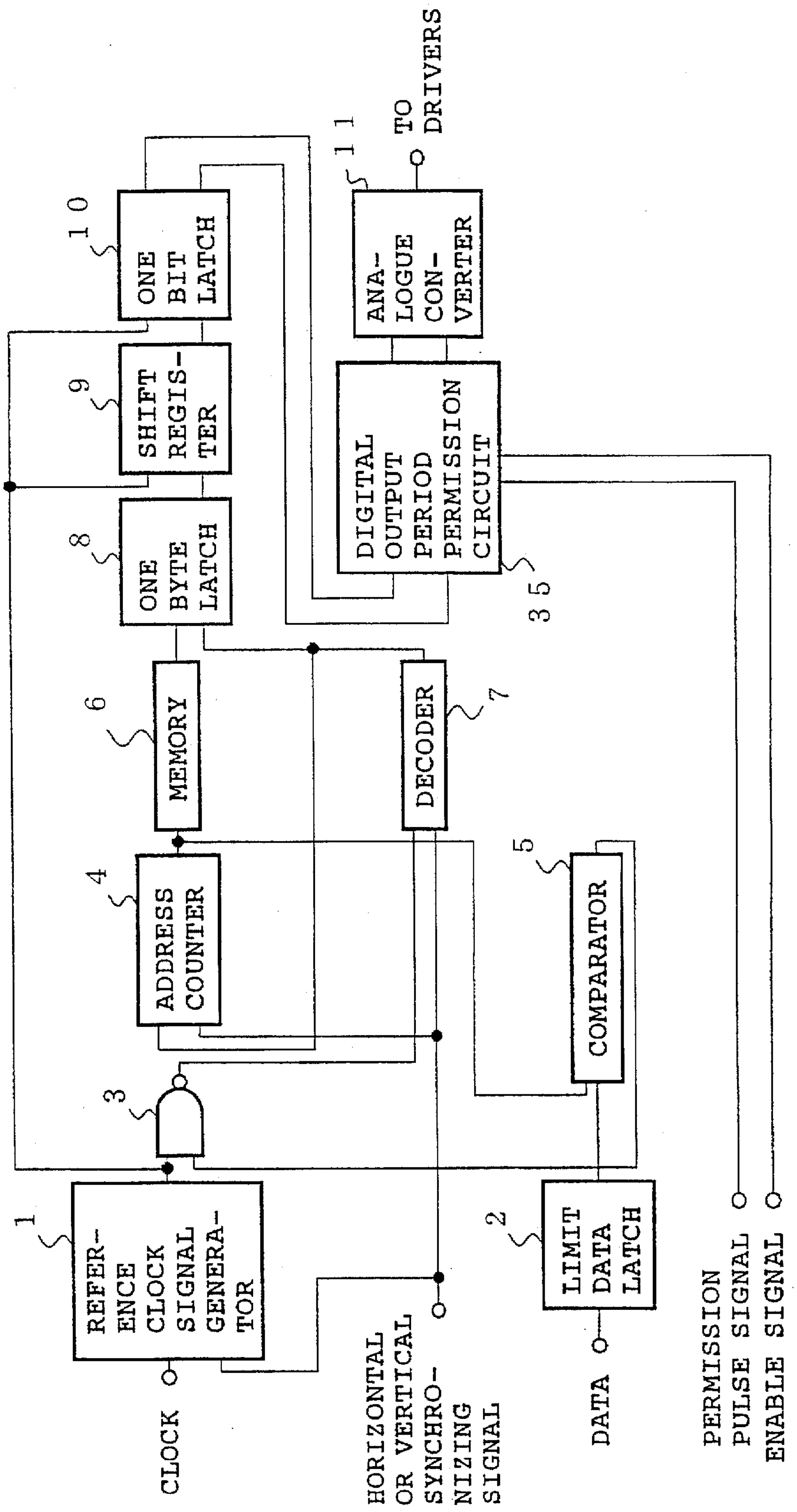
FIG. 13 is a block diagram showing a configuration of the one bit type control waveform generation circuit as the fifth embodiment according to the present invention.

FIG. 13 is a block diagram showing a configuration of the one bit type control waveform generation circuit as a fifth embodiment according to the present invention. In the diagram, reference number 35 designates a digital output period permission circuit (digital output period permission means) for receiving a permission pulse signal transmitted from outside and for controlling a time length of the output period in which a bit data item stored in the one bit latch 10 is transmitted to the analogue conversion circuit 11. The same reference numbers used in the one bit type control waveform generation circuit of the first and second embodiments shown in FIGS. 1 and 3 are used for components in the one bit type control waveform generation circuit of the fifth embodiment. Therefore the explanations of them are omitted here for brevity.

In the fifth embodiment, the digital output period length permission circuit 35 controls a transmission time length to transmit a bit data item stored in the one bit latch 10 to the analogue conversion circuit 11 by using the permission pulse signal provided from outside and generates an optional control waveform having a constant pulse-height value against frequency changes of the horizontal and vertical synchronizing signals while keeping the change of the bit data item constantly. Thereby, it can be prevented to cause picture distortion caused by the change of the frequency of the horizontal or vertical synchronizing signal.

Figure 14:
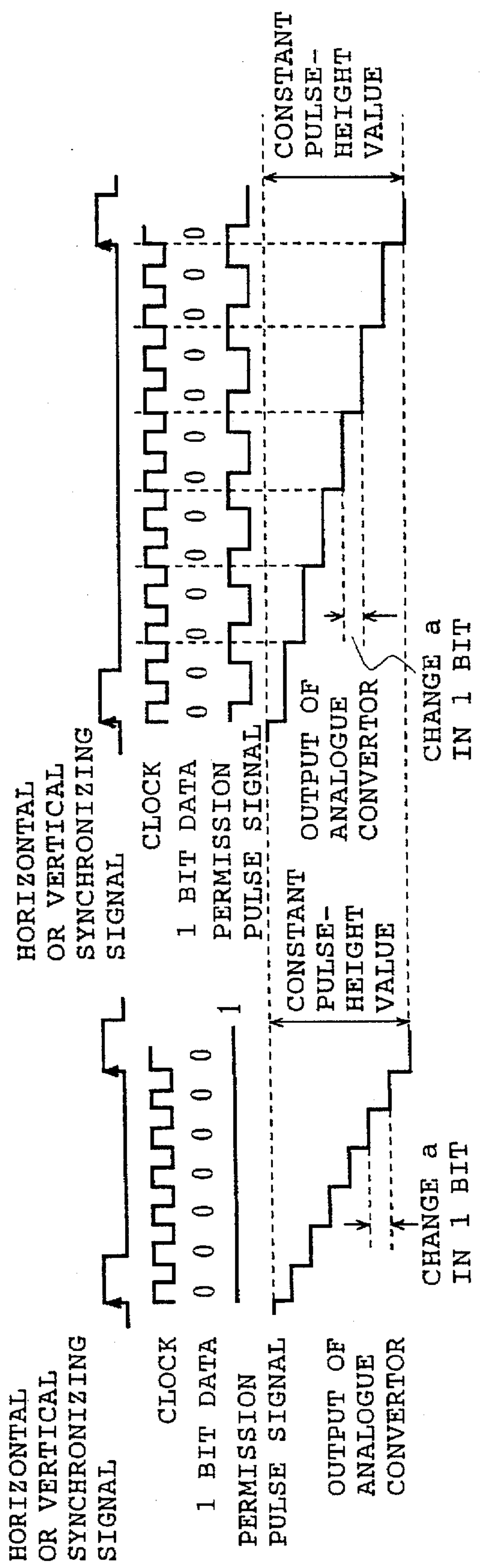
FIG. 14 is a timing chart showing operations of the one bit type control waveform generation circuit shown in FIG. 13.

Next, the operation of the one bit type control waveform generation circuit of the fifth embodiment will be explained. FIG. 14 is a timing chart showing operations of the one bit type control waveform generation circuit shown in FIG. 13. The operations which are the same of the operations used in the first and second embodiments shown in FIGS. 1 to 4 are omitted here for brevity.

First, the digital output period permission circuit 35 receives the permission pulse signal to control the period. By using this permission pulse signal, the digital output period permission circuit 35 controls the output period to provide the bit data item from the one bit latch circuit 10 to the analogue conversion circuit 11. When receiving the permission pulse signal, the digital output period permission circuit 35 controls the transmission of the bit data item to the analogue conversion circuit 11 so that the change of the bit data item becomes a constant and an optional control waveform having a constant pulse-height value is generated against the frequency change of the horizontal synchronizing signal or the vertical synchronizing signal to be transmitted to the one bit type control waveform generation circuit from outside.

When the frequency of the horizontal or the vertical synchronizing signal transmitted to the one bit type control waveform generation circuit is changed, a microprocessor (not shown) detects the frequency change of the horizontal or vertical synchronizing signal so that the pulse-height value becomes a constant based on this frequency change. Next, the microprocessor (not shown) changes the pulse width of the permission pulse signal so that the bit data item is transferred to the analogue conversion circuit 11 only during the high level of the permission pulse signal. At this time, the microprocessor also transmits an enable signal to the digital output period permission circuit 35. This enable signal controls the output period of the write-in permission circuit 31 to the analogue conversion circuit 11 so that the pulse-height value of the control waveform becomes a constant.

As described above, in the fifth embodiment of the present invention, in order to control an output period to transmit a bit data item to the analogue conversion circuit 11 for converting the one bit data item transmitted from the one bit latch circuit 10 of a digital form to an analogue signal, because the digital output period permission circuit 35 receives the permission signal transferred from a microcomputer (not shown) located at outside of the one bit type control waveform generation circuit and controls the transmission of the bit data item from the one bit latch 10 to the analogue conversion circuit 11 based on the received permission pulse signal. The analogue conversion circuit 11 converts a digital signal to an analogue signal. Thereby, the one bit type control waveform generation circuit of the fifth embodiment can generate optional control waveforms having a constant pulse height while constantly keeping the change of the bit data item against the frequency change of the received horizontal or vertical synchronizing signal. Thereby, the one bit type control waveform generation circuit of the fifth embodiment according to the present invention can prevent occurrences of picture distortion displayed on a CRT (not shown) against frequency changes of received horizontal or vertical synchronizing signals.

Embodiment 6

Figure 15:
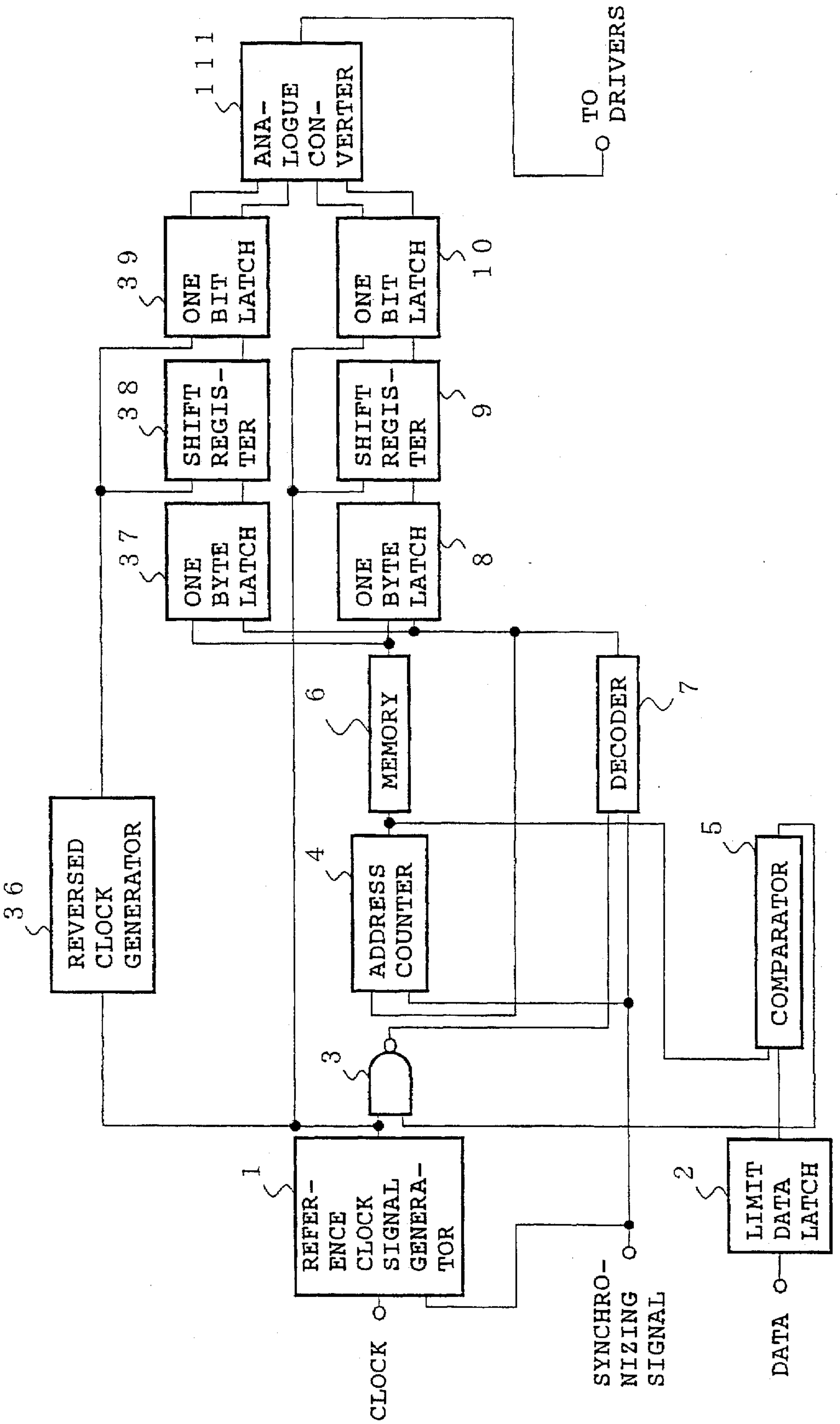
FIG. 15 is a block diagram showing a configuration of the one bit type control waveform generation circuit as the sixth embodiment according to the present invention.

FIG. 15 is a block diagram showing a configuration of the one bit type control waveform generation circuit as the sixth embodiment according to the present invention. In the diagram, reference number 36 designates a reversed clock generation circuit (reversed clock generation means) for receiving a synchronizing signal and for generating a reversed clock having a predetermined frequency value in synchronism with this synchronizing signal. Reference number 37 denotes a one byte latch (second one byte latch means) for receiving the address count clock from the decoder 7 as a latch timing and for temporarily storing a one byte data item stored in the memory 6. Reference number 38 denotes a shift register (second shift register means) for receiving the reversed clock of the reference clock transmitted from the reversed clock generation circuit 36 and for receiving the byte data item from the one byte latch 37 based on the reversed clock and for converting the received byte data item to bit data items per bit. The reference number 111 designates an analogue convertor.

Reference number 39 designates a one bit latch circuit (second one bit latch means) for receiving the reversed clock transmitted from the reversed clock generation circuit 36 and for receiving the obit data item from the shift register 38 based on the received reversed clock and for temporarily storing the one bit data item. The same reference numbers used in the one bit type control waveform generation circuit of the first and second embodiments shown in FIGS. 1 and 3 are used for components in the one bit type control waveform generation circuit of the sixth embodiment. Therefore the explanations of them are omitted here for brevity.

In the sixth embodiment, the one bit type control waveform generation circuit reads a byte data item stored in the memory 6 and also reads a one byte date item stored in the memory 6 based on a reference clock that is delayed by a half clock of the reference clock in period and converts them. The one bit type control waveform generation circuit adds the converted signals describe above to generate an optional control waveform from the analogue conversion circuit 111. Thereby, the resolution of the control waveform per bit can be improved by adjusting the change of the control waveform per bit during a picture display period.

Next, the operation of the one bit type control waveform generation circuit of the sixth embodiment will be explained.

Figure 16:
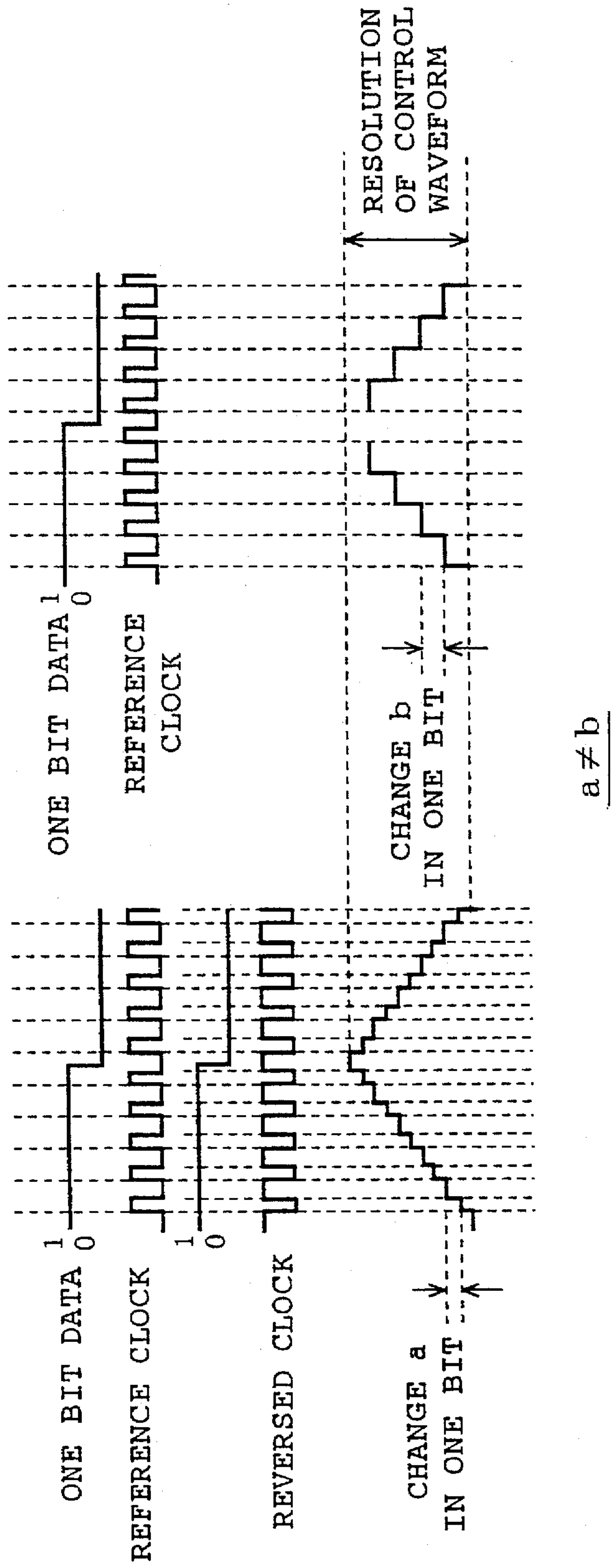
FIG. 16 is a timing chart showing operations of the one bit type control waveform generation circuit shown in FIG. 15.

FIG. 16 is a timing chart showing operations of the one bit type control waveform generation circuit shown in FIG. 15. The operations which are the same of the operations used in the first and second embodiments shown in FIGS. 1 to 4 are omitted here for brevity.

First, the reversed clock generation circuit 36 receives the reference clock having the predetermined frequency value transmitted from the reference clock generation circuit 1 and generates the reversed clock of the reference clock in a phase and provides it. Next, the decoder 7 generates and provides the address count clock. The value of the address count clock in the decoder 7 is reset by receiving the horizontal synchronizing signal or the vertical synchronizing signal transmitted from outside.

The one byte latch circuit 37 receives the address count clock transmitted from the decoder 7 as a latch timing clock, like the one byte latch circuit 8, and reads out a byte data item stored in the memory 6 and stores it temporarily. The shift register 38 converts the byte data item latched by the one byte latch circuit 37 into bit data items whose phase are delayed by a half clock to the byte data item in synchronism with the reversed clock signal transmitted from the reversed clock generation circuit 36. The one bit latch circuit 39 receives the one bit data items whose phase is delayed by a half clock in synchronism with the reversed clock and temporarily stores it and provides it to the analogue conversion circuit 111.

Next, the one bit type control waveform generation circuit of the sixth embodiment adds the one bit data item transmitted from the one bit type control waveform generation circuit of the first embodiment with the one bit data item whose phase is delayed by a half clock transmitted from the one bit latch circuit 39 to generate an analogue signal. Thereby, the one bit type control waveform generation circuit of the sixth embodiment can improve the resolution of the control waveform per bit by adjusting the change of the control waveform per bit during a picture display period.

As described above, in the sixth embodiment, a byte date item stored in the memory 6 is read out based on a reference clock having a predetermined frequency value and converted to generate bit data item. The byte date item stored in the memory 6 is also read out based on a clock whose phase is delayed by a half to the reference clock and converted to generate bit data items. Both bit data items are added and converted by the analogue conversion circuit 111 in order to generate optional control waveforms. Thereby, the one bit type control waveform generation circuit of the sixth embodiment can improve the resolution of the control waveform per bit by adjusting the change of the control waveform per bit during a picture display period and can control a pulse-height value of generated control waveforms at a high accuracy.

Embodiment 7

Figure 17:
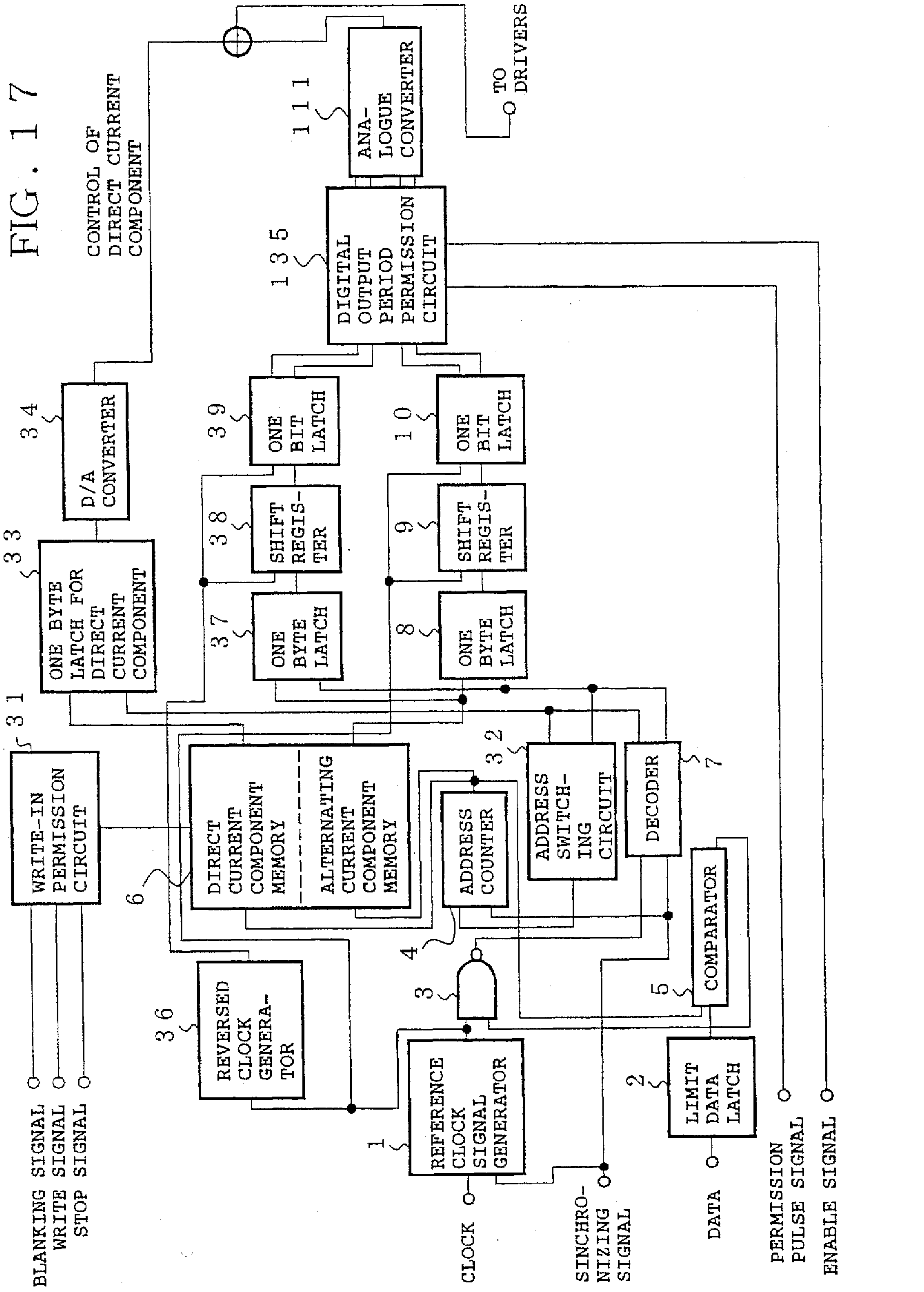
FIG. 17 is a block diagram showing a configuration of the one bit type control waveform generation circuit as the seventh embodiment according to the present invention.
Figure 18:
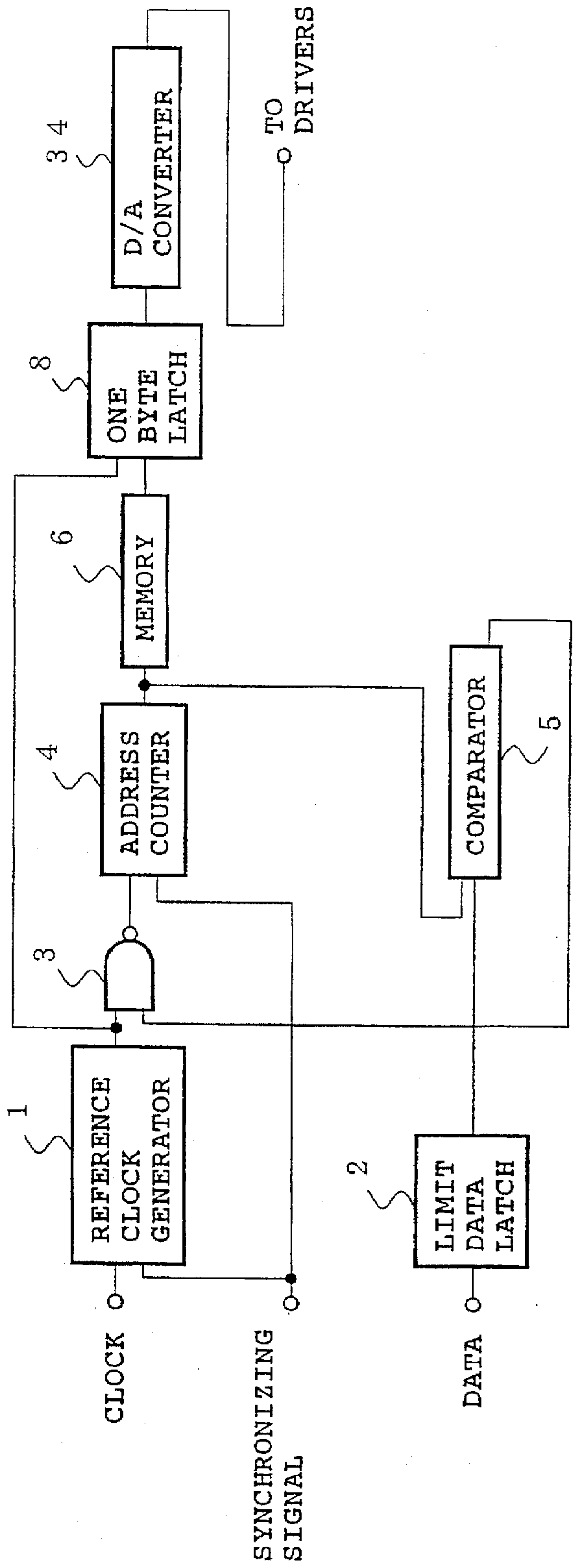
FIG. 18 (PRIOR ART)
FIG. 18 is a block diagram showing a configuration of a conventional control waveform generation circuit.
Figures 19A, 19B:
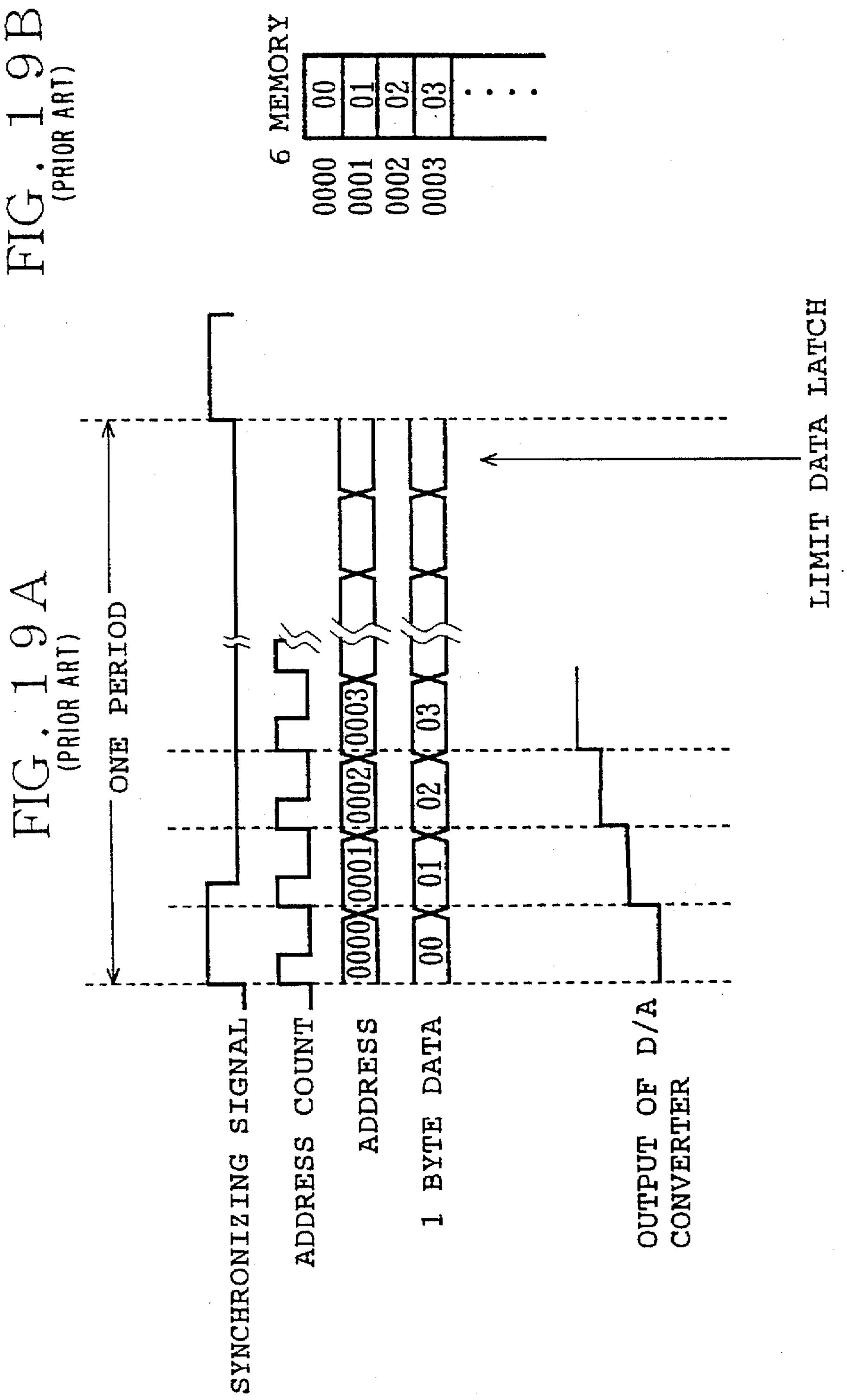
FIG. 19A (PRIOR ART)
FIG. 19B (PRIOR ART)
FIG. 19A is a timing chart showing operations of the conventional control waveform generation circuit shown in FIG. 18.
FIG. 19B is an explanatory diagram showing contents of the memory.

FIG. 17 is a block diagram showing a configuration of the one bit type control waveform generation circuit as the seventh embodiment according to the present invention. In the diagram, reference number 135 designates the digital output period permission circuit that is the same function and operation as the digital output period permission circuit 35 shown in FIG. 13. The one bit type control waveform generation circuit of the seventh embodiment is the combination of the first embodiment or the second embodiment, and the third to sixth embodiments. Therefore, the same reference numbers used in the one bit type control waveform generation circuit of the first, second, third to sixth embodiments shown in FIGS. 1 to 16 are used for components in the one bit type control waveform generation circuit of the seventh embodiment. Therefore the explanations of them are omitted here for brevity.

The one bit type control waveform generation circuit of the seventh embodiment can have the functions and the operations of the first to sixth embodiments by combining them. The one bit type control waveform generation circuit of the seventh embodiment has the same operations as the first to sixth embodiments. Therefore, the explanation for the operation of the seventh embodiment is omitted here.

As described above, in the one bit type control waveform generation circuit of the seventh embodiment, since the write-in operation to a memory is performed during the output of a blanking signal, it can be avoided to happen picture distortion on a CRT caused by this write-in operation. Further, data items of a direct current component and an alternating current component are stored into different memory fields in the memory 6 addressed by different addresses, and then each of the byte data items stored in the memory 6 is read out to control a direct current component of a control waveform at a high accuracy.

Furthermore, since a bit data item is converted to an analogue signal during the transmission of a permission pulse signal by using the permission pulse signal to control an output period of a bit data item to convert a digital form to an analogue form, the change of the bit data item against a frequency change of a horizontal or vertical synchronizing signal transmitted from outside can be kept at a constant, optional control waveforms can be generated, and it can prevents occurrences of picture distortion caused by the change of the frequency of the horizontal or vertical synchronizing signal.

In addition, a byte date item stored in the memory 6 is read out based on the reference clock having a predetermined frequency value and converted to generate bit data items. The byte date items stored in the memory 6 is also read out based on a clock whose phase is delayed by a half to the reference clock and converted to generate bit data items. Both bit data items are added and converted by the analogue conversion circuit 111 in order to generate optional control waveforms. Thereby, the one bit type control waveform generation circuit of the seventh embodiment can improve the resolution of the control waveform per bit by adjusting the change of the control waveform per bit during a picture display period and can control a pulse-height value of the control waveform at a high accuracy.

As described above, since the analogue circuit converts a byte data item stored in a memory to bit data items and generates optional control waveforms in the present invention, therefore, the present invention can provide the one bit type control waveform generation circuit having a small size in circuit configuration without incorporating a memory and a D/A converter for each drive circuit in order to generate optional control waveforms to be used for drive circuits.

Furthermore, since the analogue conversion circuit converts a byte data item stored in the memory to bit data items and generates optional horizontal control waveforms by using an address count clock in synchronism with a reference clock having a predetermined frequency value generated by a clock signal in synchronism with a horizontal synchronizing signal, the present invention can provide the one bit type control waveform generation circuit having a small size in circuit configuration without incorporating a memory and a D/A converter for each drive circuit in order to generate optional horizontal control waveforms to be used for drive circuits.

Moreover, since the analogue conversion circuit converts a byte data item stored in the memory to bit data items and generates optional horizontal control waveforms by using an address count clock in synchronism with a reference clock having a predetermined frequency value generated by a horizontal synchronizing signal in synchronism with a vertical synchronizing signal, the present invention can provide the one bit type control waveform generation circuit having a small size in circuit configuration without incorporating a memory and a D/A converter for each drive circuit in order to generate optional vertical control waveforms to be used for drive circuits.

Furthermore, the one bit latch means comprises a first flip flop for receiving a reference clock to operate, a first NOR circuit for receiving an output signal from the first flip flop and the reference clock, a second NOR circuit for receiving the reversed signal of the output signal from the first flip flop and the reference clock to operate, a second flip flop for latching a one bit data item from the shift register means based on the output from the first NOR circuit as a timing signal and a third flip flop for latching the bit data item transmitted from the shift register means based on the output from the second NOR circuit as a timing signal. Accordingly, the one bit latch means provides an addition signal and a subtraction signal to drive the analogue conversion circuit.

Moreover, since the analogue conversion means to generate a control waveform, which comprises an addition subtraction circuit for receiving an addition signal from the second flip flop as a reversed signal and a subtracted signal from the third flip flop as a non-reversed signal and for executing an addition operation and a subtraction operation at the same time, an integral circuit for receiving the output signal from the addition subtraction circuit as a reversed signal, and a voltage follower circuit for receiving the output from the integral circuit as a non-reversed signal, the one bit type control waveform generation circuit of the present invention has an effect to generate an optional vertical control waveform to be required to drive circuits.

Furthermore, since the write-in permission means writes data items into the memory means during a transmission of a blanking signal from outside, it can be avoided to cause picture distortion on a CRT by the write-in operation to the memory means and can perform the data write-in operation to the memory means efficiently.

Further, since data items to be stored into the memory means are separated into direct current components and alternating current components, the direct current components and the alternating current components are stored into memory fields whose addresses are different to each other, the starting voltage is generated by using the direct current components and a voltage after the starting voltage is generated by using the alternating current components, the present invention has an effect to generate an optional control waveform having a large dynamic range whose pattern can be changeable per period.

In addition, because the digital output period permission means permits the transmission of a bit data item to the analogue conversion means while receiving a permission pulse signal, the one bit type control waveform generation circuit of the present invention can generate optional control waveforms having a constant pulse height while keeping the change of the bit data item against a frequency change of a received horizontal or vertical synchronizing signal and it can be avoided to cause picture distortion by the frequency change of the horizontal or the vertical synchronizing signal.

Furthermore, since the analogue conversion means adds a bit date item read out from the memory means based on a reference clock and a bit data item based on a clock whose phase is delayed by a half to the reference clock and generates optional control waveforms, the one bit type control waveform generation circuit of the present invention can improve the resolution of the optional control waveforms per bit by changing the magnitude of the change of the control waveforms per bit, so that a pulse-height value of the optional control waveforms can be controlled at a high accuracy.

Moreover, since the configuration of the one bit type control waveform generation circuit of the present invention are formed by combining the configurations of the one bit type control waveform generation circuits described above, the one bit type control waveform generation circuit can control a vertical current component in a control waveform per period and can improve the resolution of the control waveform per bit by adjusting the change of the control waveform per bit and can control a pulse-height value of the control waveform constantly at a high accuracy against the frequency change of a received synchronizing signal without causing any picture distortion caused by the change of a frequency of a horizontal or a vertical synchronizing signal.

While the above provides a full and complete disclosure of the preferred embodiments of the present invention, various modifications, alternate constructions and equivalents may be employed without departing from the true spirit and scope of the invention. Therefore the above description and illustration should not be construed as limiting the scope of the invention, which is defined by the appended claims.

What is claimed is:

1. A one bit type control waveform generation circuit comprising:

reference clock generation means for generating a reference clock having a desired frequency value in synchronism with a synchronizing signal;

decoder means for generating an address count clock in synchronism with the reference clock and the value of the address count clock from the decoder means being reset by receiving the synchronizing signal;

address counter means for counting the number of the address count clocks transferred from the decoder means;

comparator means for comparing the counted value from the address counter means with a desired count value and for halting the transmission of the reference clock to the decoder means when both the counted value and the desired count value are equal to each other; and read-out conversion means for reading out a data item having a predetermined data length from memory means addressed by the counted value transferred from the address counter means and for reading out a bit data item per bit from the readout data having the predetermined data length, for converting the bit data item of a digital form to an analogue signal to form an optional control waveform, and for providing the optional control waveform to outside.

2. A one bit type control waveform generation circuit comprising:

reference clock generation means for generating a reference clock having a desired frequency value in synchronism with a synchronizing signal, wherein the reference clock generation means receives a clock signal and a horizontal synchronizing signal as the synchronizing signal and generates the reference clock having a predetermined frequency value which is synchronized with the synchronizing signal;

decoder means for generating an address count clock in synchronism with the reference clock and the value of the address count clock from the decoder means being reset by receiving the synchronizing signal;

address counter means for counting the number of the address count clocks transferred from the decoder means;

comparator means for comparing the counted value from the address counter means with a desired count value and for halting the transmission of the reference clock to the decoder means when both the counted value and the desired count value are equal to each other:

read-out conversion means for reading out a data item having a predetermined data length from memory means addressed by the counted value transferred from the address counter means and for reading out a bit data item per bit from the readout data having the predetermined data length, for converting the bit data item of a digital form to an analogue signal to form an optional control waveform, and for providing the optional control waveform to outside; and limit data latch means for storing a horizontal period count limit value as a count limit value used for the horizontal synchronizing signal, wherein the decoder means generates the address count clock which is in synchronism with the reference clock, the value of the address count clock is reset based on the horizontal synchronizing signal, the address counter means counts the number of the address count clock transferred from the decoder means and the counted value from the address counter means is reset based on the horizontal synchronizing signal, the comparator means compares the counted value from the address counter means with the horizontal synchronous count limit value and halts the transmission of the reference clock to the decoder means when both the counted value and the horizontal synchronous count limit value are equal to each other, the memory means reads the counted value as an address data item from the address counter means and reads out one byte data item which has already been stored in a memory field addressed by the counted value, and the readout conversion means comprises:

one byte latch means for receiving the byte data item from the memory means based on the address count clock as a data latch timing transmitted from decoder means and for storing the received byte data item;

shift register means for converting the byte data item stored in the one byte latch means based on the reference clock to a bit data item;

one bit latch means for storing the bit data item transmitted from the shift register means based on the reference clock; and analogue conversion means for converting the bit data item in a digital form stored in the one bit latch means to an analogue signal, for generating an optimum control waveform, and for transmitting the generated control waveform to outside.

3. A one bit type control waveform generation circuit as claimed in claim 2, wherein the one bit latch means comprises:

a first flip flop for receiving the reference clock to operate;

a first NOR circuit for receiving an output signal from the first flip flop and the reference clock;

a second NOR circuit for receiving the reversed signal of the output signal from the first flip flop and the reference clock to operate;

a second flip flop for latching a one bit data item from the shift register means based on the output from the first NOR circuit as a timing signal; and a third flip flop for latching the bit data item transmitted from the shift register means based on the output from the second NOR circuit as a timing signal.

4. A one bit type control waveform generation circuit as claimed in claim 3, wherein the analogue conversion means comprises:

an addition subtraction circuit for receiving the addition signal from the second flip flop as a reversed signal and the subtracted signal from the third flip flop as a non-reversed signal and for executing an addition operation and a subtraction operation at the same time;

an integral circuit for receiving the output signal from the addition subtraction circuit as a reversed signal to operate; and a voltage follower circuit for receiving the output from the integral circuit as a non-reversed signal and for generating a control waveform.

5. A one bit type control waveform generation circuit as claimed in claim 2, further comprising:

write-in permission means for permitting a data replace operation to replace data items stored in the memory means with new data items while a blanking signal in order to erase the retrace line of a scanning line is received, wherein the data items stored in the memory means are replaced during the picture display operation period executed by using the control waveforms.

6. A one bit type control waveform generation circuit as claimed in claim 2, wherein the memory means stores a direct current component and an alternating current component of the byte data item into different memory fields addressed by different addresses, respectively, the decoder means generates address count clocks for the direct current component and the alternating current component in synchronism with the reference clock, and the address count clocks of the direct current component and the alternating current component are reset based on the horizontal synchronizing signal and the vertical synchronizing signal, the one bit type control waveform generation circuit further comprises:

address switching means for switching alternately the address count clocks for the direct current component and the alternating current component;

one byte latch means for receiving the address count clock for the direct current component transmitted from the decoder means as a latch timing clock and for storing a one byte data item from the memory means; and D/A conversion means for converting the direct current component of a digital form to an analogue signal in an analogue form and for optionally determining a voltage as a starting voltage by using the direct current component and a voltage used after the starting voltage by using the alternating current component to generate a control waveform having a large dynamic range which can be changeable per period.

7. A one bit type control waveform generation circuit as claimed in claim 2, further comprises: digital output period permission circuit located between the one bit latch means and the analogue conversion means for receiving a permission pulse signal to control a period to supply a bit data item from the one bit latch means to the analogue conversion means and for controlling to provide the bit data item to the analogue means during the receiving of the permission pulse signal and for generating an optional control waveform having a constant pulse-height value according to the change of the frequency of the synchronizing signal while pictures are displayed based on the control waveforms, wherein the one bit type control waveform generation circuit prevents to generate picture distortion caused by the change of the frequency of the horizontal or vertical synchronizing signal.

8. A one bit type control waveform generation circuit as claimed in claim 2, further comprises:

reversed clock generation means for generating and providing a reversed clock of the reference clock transferred from the reference clock generation means;

second one byte latch means for receiving the byte data item from the memory means based on the address count clock as a data latch timing transmitted from decoder means and for storing the received byte data item;

second shift register means for receiving the byte data item stored in the second one byte latch means based on the reversed clock of the reference clock and for converting the byte data item to a bit data item; and second one bit latch means for temporarily storing the bit data item transmitted from the second shift register means based on the reversed clock, wherein the analogue conversion means generates a control waveform based on the outputs from the one bit latch means and the second one bit latch means so that resolution of the control waveform per bit can be improved during a picture display period based on the control waveform transmitted from the analogue conversion means.

9. A one bit type control waveform generation circuit comprising:

reference clock generation means for generating a reference clock having a desired frequency value in synchronism with a synchronizing signal, wherein the reference clock generation means receives a vertical synchronizing signal and a horizontal synchronizing signal and generates a reference clock having a predetermined frequency value which is synchronized with the vertical synchronizing signal;

decoder means for generating an address count clock in synchronism with the reference clock and the value of the address count clock from the decoder means being reset by receiving the synchronizing signal;

address counter means for counting the number of the address count clocks transferred from the decoder means;

comparator means for comparing the counted value from the address counter means with a desired count value and for halting the transmission of the reference clock to the decoder means when both the counted value and the desired count value are equal to each other;

read-out conversion means for reading out a data item having a predetermined data length from memory means addressed by the counted value transferred from the address counter means and for reading out a bit data item per bit from the readout data having the predetermined data length, for converting the bit data item of a digital form to an analogue signal to form an optional control waveform, and for providing the optional control waveform to outside; and limit data latch means for storing a vertical period count limit value as a count limit value used for the vertical synchronizing signal, wherein the decoder means generates an address count clock which is in synchronism with the reference clock, the value of the address count clock is reset based on the horizontal synchronizing clock signal, the address counter means counts the number of the address count clock from the decoder means, and the counted value from the address counter means is reset based on the vertical synchronizing signal, the comparator means compares the counted value from the address counter means with the vertical synchronous count limit value stored in the limit data latch means and halts the transmission of the reference clock to the decoder means when both the counted values and the vertical synchronous count limit value are equal to each other, the memory means reads the counted value as an address data item from the address counter means and reads out one byte data item which has already been stored in a memory field addressed by the counted value, and the readout conversion means comprises:

one byte latch means for receiving a byte data item from the memory means based on the address count clock as a data latch timing transmitted from decoder means and for storing the received byte data item;

shift register means for converting the byte data item stored in the one byte latch means based on the reference clock to a bit data item;

one bit latch means for storing the bit data item transmitted from the shift register means based on the reference clock; and analogue conversion means for converting the bit data item in a digital form stored in the one bit latch means to an analogue signal, for generating an optimum control waveform, and for transmitting the generated control waveform to outside.

10. A one bit type control waveform generation circuit as claimed in claim 9, wherein the one bit latch means comprises:

a first flip flop for receiving the reference clock to operate;

a first NOR circuit for receiving an output signal from the first flip flop and the reference clock;

a second NOR circuit for receiving the reversed signal of the output signal from the first flip flop and the reference clock to operate;

a second flip flop for latching a one bit data item from the shift register means based on the output from the first NOR circuit as a timing signal; and a third flip flop for latching the bit data item transmitted from the shift register means based on the output from the second NOR circuit as a timing signal.

11. A one bit type control waveform generation circuit as claimed in claim 10, wherein the analogue conversion means comprises:

an addition subtraction circuit for receiving the addition signal from the second flip flop as a reversed signal and the subtracted signal from the third flip flop as a non-reversed signal and for executing an addition operation and a subtraction operation at the same time;

an integral circuit for receiving the output signal from the addition subtraction circuit as a reversed signal to operate; and a voltage follower circuit for receiving the output from the integral circuit as a non-reversed signal and for generating a control waveform.

12. A one bit type control waveform generation circuit as claimed in claim 9, further comprising:

write-in permission means for permitting a data replace operation to replace data items stored in the memory means with new data items while a blanking signal in order to erase the retrace line of a scanning line is received, wherein the data items stored in the memory means are replaced during the picture display operation period executed by using the control waveforms.

13. A one bit type control waveform generation circuit as claimed in claim 9, wherein the memory means stores a direct current component and an alternating current component of the byte data item into different memory fields addressed by different addresses, respectively, the decoder means generates address count clocks for the direct current component and the alternating current component in synchronism with the reference clock, and the address count clocks of the direct current component and the alternating current component are reset based on the horizontal synchronizing signal and the vertical synchronizing signal, the one bit type control waveform generation circuit further comprises:

address switching means for switching alternately the address count clocks for the direct current component and the alternating current component;

one byte latch means for receiving the address count clock for the direct current component transmitted from the decoder means as a latch timing clock and for storing an one byte data item from the memory means; and D/A conversion means for converting the direct current component of a digital form to an analogue signal in an analogue form and for optionally determining a voltage as a starting voltage by using the direct current component and a voltage used after the starting voltage by using the alternating current component to generate a control waveform having a large dynamic range which can be changeable per period.

14. A one bit type control waveform generation circuit as claimed in claim 9, further comprises: digital output period permission circuit located between the one bit latch means and the analogue conversion means for receiving a permission pulse signal to control a period to supply a bit data item from the one bit latch means to the analogue conversion means and for controlling to provide the bit data item to the analogue means during the receiving the permission pulse signal and for generating an optional control waveform having a constant pulse-height value according to the change of the frequency of the synchronizing signal while pictures are displayed based on the control waveforms, wherein the one bit type control waveform generation circuit prevents to generate picture distortion caused by the change of the frequency of the horizontal or vertical synchronizing signal.

15. A one bit type control waveform generation circuit as claimed in claim 9, further comprises:

reversed clock generation means for generating and providing a reversed clock of the reference clock transferred from the reference clock generation means;

second one byte latch means for receiving the byte data item from the memory means based on the address count clock as a data latch timing transmitted from decoder means and for storing the received byte data item;

second shift register means for receiving the byte data item stored in the second one byte latch means based on the reversed clock of the reference clock and for converting the byte data item to a bit data item; and second one bit latch means for temporarily storing the bit data item transmitted from the second shift register means based on the reversed clock, wherein the analogue conversion means generates a control waveform based on the outputs from the one bit latch means and the second one bit latch means so that resolution of the control waveform per bit can be improved during a picture display period based on the control waveform transmitted from the analogue conversion means.

16. A one bit type control waveform generation circuit, comprising:

reference clock generation means for receiving a synchronizing signal and for generating a reference clock having a desired frequency value in synchronism with the synchronizing signal;

reversed clock generation means for generating and providing a reversed clock of the reference clock transferred from the reference clock generation means;

limit data latch means for storing a period count limit value as a count limit value used for the synchronizing signal;

decoder means for generating address count clocks for a direct current component and a alternating current component in synchronism with the reference clock, and the address count clocks of the direct current component and the alternating current component being reset based on the synchronizing signal;

address switching means for switching alternately the address count clocks for the direct current component and the alternating current component transferred from the address switching means;

address counter means for counting the number of the address count clocks transferred from the address switching means in which the counter value being reset based on the synchronizing signal;

comparator means for comparing the counted value from the address counter means with the period count limit value stored in the limit data latch means and for halting the transmission of the reference clock to the decoder means when both the counted values and the period count limit value being equal to each other;

memory means for storing a direct current component and an alternating current component of the byte data item into different memory fields addressed by different addresses, respectively, and for reading out one byte data item which has already being stored in a memory field addressed by the counted values transferred from the address counter means;

one byte latch means located for each of the direct current component and the alternating current component for receiving the address count clocks transmitted from the decoder means as a latch timing clock and for storing a one byte data item from the memory means based on the address count clock;

shift register means located for each of the direct current component and the alternating current component for converting the byte data item stored in the one byte latch means based on the reference clock and the reversed clock to a bit data item;

one bit latch means located for each of the direct current component and the alternating current component for storing the bit data item transmitted from corresponding to the shift register means based on the reference clock and the reversed clock;

analogue conversion means for converting the bit data item in a digital form stored in the one bit latch means to an analogue signal;

write-in permission means for permitting a data replace operation to replace data items stored in the memory means with new data items while a blanking signal in order to erase the retrace line of a scanning line is received;

one byte latch means for a direct current component for receiving the address count clock for the direct current component from the decoder means as a latch timing and for storing the data item of the direct current component from the memory means;

digital/analogue (D/A) conversion means for converting the byte data item stored in the one byte latch means for the direct current component to an analogue signal; and digital output period permission means located between the one bit latch means and the analogue conversion means for receiving a permission pulse signal to control a period to supply a bit data item from the one bit latch means to the analogue conversion means and for controlling to provide the bit data item to the analogue means during the receiving the permission pulse signal and for generating an optional control waveform having a constant pulse-height value according to the change of the frequency of the synchronizing signal while pictures are displayed on a CRT based on the control waveforms, wherein the one bit type control waveform generation circuit adds the control waveform from the analogue conversion means and the output from the D/A conversion means and generates optional control waveform and provides it to outside.

* * * * *